US008189960B2

(12) United States Patent
Kondo et al.

(10) Patent No.: US 8,189,960 B2
(45) Date of Patent: May 29, 2012

(54) IMAGE PROCESSING APPARATUS, IMAGE PROCESSING METHOD, PROGRAM AND RECORDING MEDIUM

(75) Inventors: Tetsujiro Kondo, Tokyo (JP); Tetsushi Kokubo, Kanagawa (JP); Kenji Tanaka, Kanagawa (JP); Hitoshi Mukai, Kanagawa (JP); Hirofumi Hibi, Kanagawa (JP); Kazumasa Tanaka, Chiba (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 12/490,672

(22) Filed: Jun. 24, 2009

(65) Prior Publication Data

US 2009/0324135 A1 Dec. 31, 2009

(30) Foreign Application Priority Data

Jun. 27, 2008 (JP) ................................ 2008-169446

(51) Int. Cl.
G06K 9/36 (2006.01)
G06K 9/32 (2006.01)
(52) U.S. Cl. ........ 382/284; 382/177; 382/182; 382/224; 382/292; 382/308
(58) Field of Classification Search .................. 382/100, 382/284, 294, 299
See application file for complete search history.

(56) References Cited

U.S. PATENT DOCUMENTS

| 6,269,175 | B1 * | 7/2001 | Hanna et al. | 382/107 |
| 7,151,801 | B2 | 12/2006 | Grossberg et al. | |
| 7,447,382 | B2 * | 11/2008 | Nestares et al. | 382/299 |
| 7,809,155 | B2 * | 10/2010 | Nestares et al. | 382/100 |
| 7,881,511 | B2 * | 2/2011 | Ye et al. | 382/128 |
| 7,941,004 | B2 * | 5/2011 | Zhu et al. | 382/299 |
| 2005/0219642 | A1 | 10/2005 | Yachida et al. | |

FOREIGN PATENT DOCUMENTS

| JP | 7-143439 | 6/1995 |
| JP | 9-139878 | 5/1997 |
| JP | 2005-522108 | 7/2005 |
| JP | 2005-318548 | 11/2005 |

* cited by examiner

Primary Examiner — Stephen R Koziol
(74) Attorney, Agent, or Firm — Oblon, Spivak, McClelland, Maier & Neustadt, L.L.P.

(57) ABSTRACT

An image processing apparatus includes: an imaging information calculation unit acquiring a first image and higher-resolution second images, and calculating coordinate positions of the second images to the first image and differences in imaging direction between second cameras and a first camera; an eyepoint conversion unit generating eyepoint conversion images obtained by converting the second images based on the differences in imaging direction so that eyepoints of the second cameras coincide with an eyepoint of the first camera and matching the first image with the eyepoint conversion images to calculate phase deviations of the eyepoint conversion images from the first image; and an image synthesizing unit extracting high-frequency images, having frequency components higher than or equal to a predetermined frequency band, from the second images, and pasting the high-frequency images at the coordinate positions in correspondence with the first image to eliminate the phase deviations to generate a synthesized image.

10 Claims, 22 Drawing Sheets

FIG. 5A

|  | FIRST CAMERA | SECOND CAMERA |
|---|---|---|
| RESOLUTION | LOW RESOLUTION | HIGH RESOLUTION |
| EYEPOINT | COMMON INFORMATION | PARALLAX IS PRESENT |
| CHROMATICNESS | COMMON INFORMATION | INDIVIDUAL INFORMATION |
| LUMINANCE | COMMON INFORMATION | INDIVIDUAL INFORMATION |
| FOCUS | COMMON INFORMATION | INDIVIDUAL INFORMATION |

FIG. 5B

|  | GENERATED IMAGE |
|---|---|
| RESOLUTION | HIGH RESOLUTION EQUIVALENT TO THAT OF SECOND CAMERA |
| EYEPOINT | SINGLE EYEPOINT THAT COINCIDES WITH EYEPOINT OF FIRST CAMERA |
| CHROMATICNESS | COLOR INFORMATION MORE DETAILED THAN COLOR OF FIRST CAMERA |
| LUMINANCE | LUMINANCE INFORMATION MORE DETAILED THAN LUMINANCE OF FIRST CAMERA |
| FOCUS | ADJUST FOCUS FOR EACH IMAGING AREA |

IMAGE PROCESSING APPARATUS, IMAGE PROCESSING METHOD, PROGRAM AND RECORDING MEDIUM

BACKGROUND OF THE INVENTION

1. Field of the Invention

The invention relates to an image processing apparatus, image processing method, program and recording medium that are suitably applied, for example, when an image captured in a wide angle of view is projected onto a screen.

2. Description of the Related Art

In an existing art, in order to capture a landscape, or the like, in a wide angle of view, for example, a panoramic imaging method, a multi-camera imaging method in which a plurality of cameras are placed at a plurality of locations, an imaging method in which a low-resolution dynamic image is synthesized with a high-resolution static image, a multi-focus imaging method that uses a camera having a plurality of foci, and the like, are employed. Hereinafter, the above imaging methods will be simply described.

In the panoramic imaging method, images captured by a plurality of cameras are pieced together to generate a wide-area image. The panoramic imaging method includes a single eyepoint method and a multiple eyepoint method. In the single eyepoint method, because a plurality of cameras capture a subject at one and the same location, a pieced image has no boundary. In the multiple eyepoint method, because a plurality of cameras capture a subject at different locations, a pieced image has a boundary.

In the case of the single eyepoint method, the peripheral portions of images before being pieced deform because of the characteristics, or the like, of the lenses assembled to the cameras. Deformation of images causes degradation of a pieced image. If a deformed image is directly projected onto a screen, deformation in the image at the edge of the screen becomes further conspicuous. In addition, a common portion at which adjacent images overlap occurs around a boundary of images captured by the adjacent cameras. Here, the common portion of the adjacent images will be described with reference to FIG. 27.

FIG. 27 is an example of an imaging method using cameras that are arranged so that imaging directions of the cameras meet at one point. In this method, three cameras 101a to 101c are arranged in extended lines in the imaging directions with respect to a virtual focus 102 as a reference. Note that the imaging directions respectively coincide with the optical axes of the cameras. Then, a point at which the plurality of optical axes meet one another is used as a virtual "eyepoint of a camera array (a plurality of cameras)". When images captured by the plurality of cameras are synthesized, it may be necessary to consider two types of eyepoints, that is, the "eyepoint of the camera array" and the "eyepoints of the cameras". Here, the method for making the "eyepoints of the cameras" coincide with one another has two types, and these methods are called "single eyepoint method". The first method captures a subject using a relay optical system with a physically one lens. The second method captures a subject so that cameras are respectively set to angles of view without any common portion at which adjacent images overlap. Even when the "eyepoints of the cameras" are intended to coincide with one another using a method other than the above two types of single eyepoint methods, it is difficult because the size of the lens differs among the cameras.

Referring back to FIG. 27, the cameras 101a to 101c each capture a subject located in a long-distance view 103 and a short-distance view 105 at the same angle of view. Then, the cameras 101a to 101c focus on an object focal plane 104. At this time, there is a common portion 103a at which imaging portions of the adjacent cameras 101a and 101b overlap in the long-distance view 103. Similarly, there is a common portion 103b at which imaging portions of the adjacent cameras 101b and 101c overlap is present in the long-distance view 103. In addition, there is a common portion 104a at which imaging portions of the adjacent cameras 101a and 101b overlap in the object focal plane 104. Similarly, there is a common portion 104b at which imaging portions of the adjacent cameras 101b and 101c overlap in the object focal plane 104.

The common portions 103a, 103b, 104a and 104b of the images captured by the cameras 101a to 101c are mixed in chromaticness pixel by pixel. However, when the eyepoints of the plurality of cameras do not coincide with one another, an object distance from each camera to a subject varies. A plurality of images captured on a specific focal plane (in this example, the plane of the object focal plane 104) may be pieced smoothly, whereas, when an object distance from each camera to a subject varies (in this example, a state where the long-distance view 103 and the short-distance view 105 are mixed), a joint between the images tends to appear to be unnatural (also referred to as "short-distance view split"). Thus, even when the common portions of the plurality of images are mixed with each other, it is difficult to maintain the images at high resolution.

The short-distance view split is described, for example, in Japanese Unexamined Patent Application Publication (Translation of PCT Application) No. 2005-522108. Japanese Unexamined Patent Application Publication (Translation of PCT Application) No. 2005-522108 describes a technique that an upgrading function that is learned in high-grade representation and low-grade representation is used to improve the grades of image data, video data and audio data.

On the other hand, in the multiple eyepoint method, cameras that can obtain images of the same resolution and chromaticness are arranged at a plurality of locations to capture a subject. An individual difference of each camera appears in a difference in zoom rate, or the like, so the influence of the individual difference is excluded to equalize the performances of the cameras. At this time, in order to capture a subject using cameras of which the characteristics are virtually equalized, an image obtained by each camera is calibrated by various methods.

Japanese Unexamined Patent Application Publication No. 7-143439 describes an image capturing apparatus. The image capturing apparatus integrates a dynamic image capturing unit that captures a dynamic image at a low resolution and a static image capturing unit that captures a static image at a high resolution, and obtains a high-quality image at a desired photo opportunity.

Japanese Unexamined Patent Application Publication No. 2005-318548 describes a technique for imaging so that a first image data sequence (image data sequence of low resolution and high frame rate) and a second image data sequence (image data sequence of high resolution and low frame rate) fall within the same range. When these two image data sequences are integrated to execute image processing, a high-resolution and high-frame rate image may be obtained.

The methods described in Japanese Unexamined Patent Application Publication No. 7-143439 and Japanese Unexamined patent Application Publication No. 2005-318548 assign time and resolution for each camera. For example, when one camera captures a narrow range for a long period of time, an obtained image has a high resolution. On the other hand, when another camera captures a wide range for a short period of time, an obtained image has a low resolution. In this way, there is a trade-off relationship between capturing time and resolution. Then, cameras are placed at the same location (location of eyepoint), the camera that capture a narrow range and the camera that captures a wide range are separated, and then the captured images are synthesized. As a result, an image captured at a high resolution in a wide range may be obtained, so the trade-off relationship between time and resolution is eliminated.

When a plurality of images are synthesized, a following image processing apparatus 110 is used. FIG. 28 shows an example of the configuration of the existing image processing apparatus 110. The image processing apparatus 110 includes a low-frequency extracting unit (LPF: Low Pass Filter) 111. The low-frequency extracting unit 111 inputs a high-resolution image 121, generated by a first camera that captures a subject at a narrow angle of view, and extracts a low-frequency image 122 of which the frequency is lower than a predetermined frequency band. In FIG. 28, together with processing blocks, histograms in which the abscissa axis represents a frequency and the ordinate axis represents a gain of a frequency are shown in regard to the high-resolution image 121 and the low-frequency image 122.

In addition, the image processing apparatus 110 includes a learning unit 112 and a parameter setting unit 113. The learning unit 112 learns a correspondence relationship of the high-resolution image 121 with respect to the low-frequency image 122 on the basis of the input high-resolution image 121 and low-frequency image 122. The parameter setting unit 113 sets various parameters. Then, the image processing apparatus 110 includes a mapping unit 114. The mapping unit 114 superimposes the high-resolution image 121, supplied from the parameter setting unit 113, on a low-resolution image 123 captured at a wide angle of view by a second camera (not shown) to generate a synthesized image 124. The mapping unit 114 outputs the synthesized image 124 to an external output device.

FIG. 29 shows an example of existing image processing executed by the image processing apparatus 110. First, a low-frequency extracting unit 111 reduces the band of the high-resolution image 121, captured at a narrow angle of view, to the low frequency of the low-resolution image 123 captured at a wide angle of view, and extracts the low-frequency image 122 (step S101). Subsequently, the learning unit 112 performs learning between the high-resolution image 121 and the low-frequency image 122 extracted by the low-frequency extracting unit 111, and the parameter setting unit 113 obtains parameters (step S102).

The mapping unit 114 uses the parameters set by the parameter setting unit 113, and performs mapping in which the high-resolution image 121 is superimposed at a position corresponding to the low-resolution image 123 in a wide angle of view (step S103). An image that is obtained by mapping the high-resolution image 121 on the low-resolution image 123 is output as a synthesized image.

Japanese Unexamined Patent Application Publication No. 9-139878 describes a technique for imaging with multiple foci. The above technique is intended to obtain an image of which the correct focus is achieved for any one of a long-distance view and a short-distance view. Then, the lenses of a plurality of cameras each include an outer lens that brings the long-distance view into focus and a center lens that brings the short-distance view into focus.

SUMMARY OF THE INVENTION

Incidentally, in the technique described in Japanese Unexamined Patent Application Publication (Translation of PCT Application) No. 2005-522108, the width of the common portion at which adjacent images overlap is made variable to handle a short-distance view split. However, when a plurality of objects are present within a capturing range of the cameras or when a plurality of cameras are arranged one above the other or side by side, it is difficult to piece the images smoothly.

As in the case of DRC (Digital Reality Creation: trademark), there is a process of converting even a low-resolution image, subjected to various processings and degraded, into a high-resolution image. However, even with the DRC, the band of an obtained high-resolution image is limited, so, for example, defects are conspicuous in each pixel when the image is enlarged.

In addition, the techniques described in Japanese Unexamined Patent Application Publication No. 7-143439 and Japanese Unexamined Patent Application Publication No. 2005-318548 are processes based on the structure of an I-picture and a P-picture used for MPEG (Moving Picture Experts Group). The I-picture is a high-resolution image, and the P-picture includes information related to motion of a subject. In this technique, because assignment of a camera that captures a high-resolution image and a camera that calculates motion information is fixed, it is not easy to increase resolution. For this reason, it is difficult to increase the resolution of an image with respect to the resolution of a solid-state image sensing device (for example, CMOS: Complementary Metal Oxide Semiconductor, CCD: Charge Coupled Device) provided for the camera that captures a static image.

In addition, in the technique described in Japanese Unexamined Patent Application Publication No. 9-139878, the respective lenses take charge of the foci of the long-distance view and the short-distance view to perform imaging; however, there is no focus common to a large number of cameras. Thus, each camera easily becomes out-of-focus, so a pieced image tends to appear to be unnatural.

It is desirable to obtain a high-resolution synthesized image without an unnatural peripheral portion of each image when the synthesized image in a wide range is obtained by piecing a plurality of images captured by a plurality of cameras.

According to an embodiment of the invention, a first image generated by a first camera that captures a predetermined range at a first angle of view is acquired, a plurality of second images generated by a plurality of second cameras, each of which captures a portion of the predetermined range at a second angle of view that is narrower than the first angle of view are acquired, the second images being higher in resolution than the first image, and coordinate positions of the plurality of second images with respect to the first image and differences of imaging directions of the plurality of second cameras with respect to an imaging direction of the first camera are calculated as capturing information. Eyepoint conversion images that are obtained by converting the plurality of second images are generated on the basis of the differences of the imaging directions so that eyepoints of the plurality of second cameras are made to coincide with an eyepoint of the first camera, and the first image is matched with the eyepoint conversion images to calculate deviations in phase of the eyepoint conversion images with respect to the first image High-frequency images, formed of frequency components higher than or equal to a predetermined frequency band, are extracted from the plurality of second images, and the high-frequency images are pasted at the coordinate positions in correspondence with the first image so as to eliminate the deviations in phase of the eyepoint conversion images with respect to the first image to generate a synthesized image.

With the above configuration, it is possible to obtain a high-resolution synthesized image in a wide range without an unnatural peripheral portion of each image.

According to the embodiment of the invention, it is possible to obtain a high-resolution synthesized image in a wide range without an unnatural peripheral portion of each image, so it is advantageous in that, even when the synthesized image is displayed on a large screen, a joint between the images is smooth.

BRIEF DESCRIPTION OF THE DRAWINGS

FIG. 5A and FIG. 5B are views that illustrate an example of common information and individual information in the embodiment of the invention;

DESCRIPTION OF THE PREFERRED EMBODIMENTS

Hereinafter, an embodiment of the invention will be described with reference to FIG. 1 to FIG. 25. In the present embodiment, an example in which an image processing apparatus 10 according to the embodiment of the invention is applied to an image processing system 1 to generate a high-resolution synthesized image with a wide imaging area will be described.

Example of Configuration of Image Processing System 1

Figure 1:
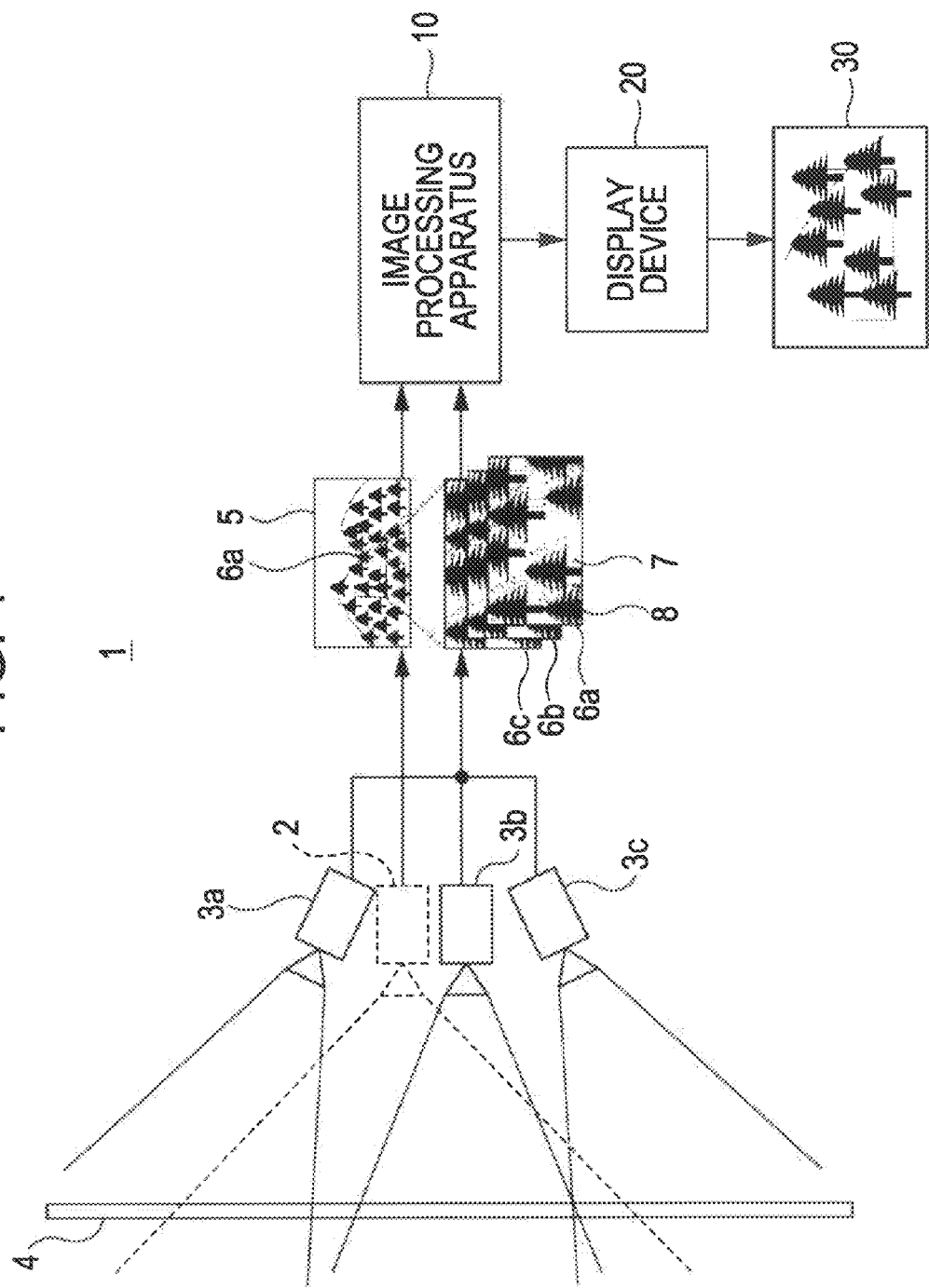
FIG. 1 is a configuration view that shows an example of an image processing system according to an embodiment of the invention.

FIG. 1 shows an example of the configuration of the image processing system 1 according to the present embodiment. The image processing system 1 includes a first camera 2 and second cameras 3a to 3c. The first camera 2 captures a predetermined range at a first angle of view to generate a first image 5. The second cameras 3a to 3c capture portions of the predetermined range at second angles of view narrower than the first angle of view, and generate second images 6a to 6c. The first image 5 and the second images 6a to 6c are supplied to the image processing apparatus 10 that synthesizes a plurality of images to generate a high-resolution image with a wide range. The synthesized image generated by the image processing apparatus 10 is output to a display device 20 formed of, for example, a projector. The display device 20 projects the input synthesized image 30 onto a screen.

High-resolution cameras, HD (High Definition) cameras, or the like, are used as the first camera 2 and the second cameras 3a to 3c. These cameras each have an individual difference, and it is expensive when a calibration is performed to adjust the individual difference. However, in the present embodiment, the second cameras 3a to 3c are calibrated on the basis of "common information" with respect to the eyepoint, chromaticness, luminance and focus of the first camera 2 as a reference. Thus, the individual difference of each camera is easily adjusted at low cost. The individual differences of the second cameras 3a to 3c are managed as "individual information" separately. In addition, the image processing apparatus 10 according to the present embodiment is, for example, able to generate an image having 10-bit grayscale using the first camera 2 and the second cameras 3a to 3c that are able to perform capturing in 8-bit grayscale depending on a luminance distribution of each area captured by each camera.

Example of Internal Configuration of Image Processing Apparatus 10

Figure 2:
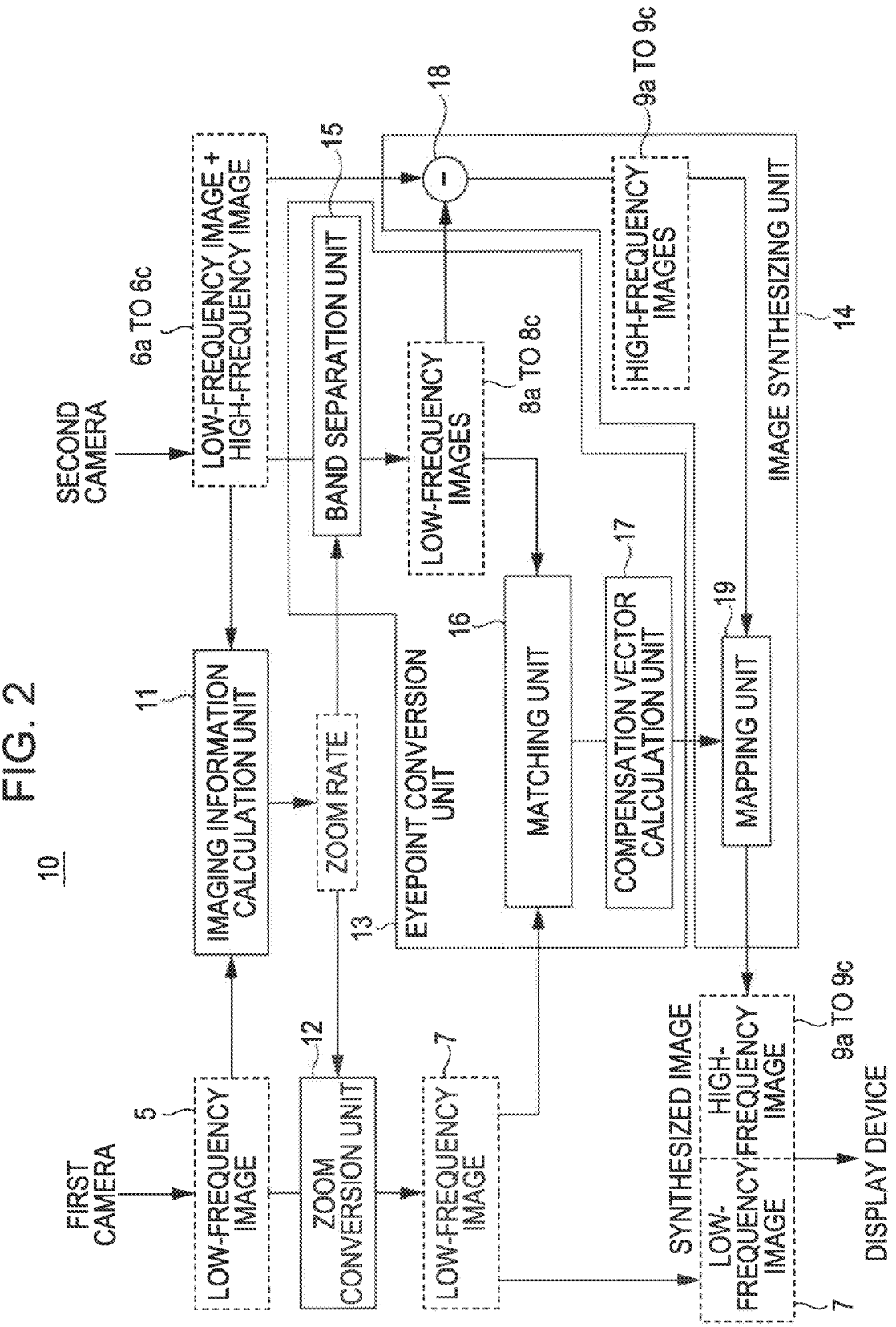
FIG. 2 is a block diagram that shows an example of the internal configuration of an image processing apparatus according to the embodiment of the invention.

FIG. 2 shows an example of the internal configuration of the image processing apparatus 10. The image processing apparatus 10 includes an imaging information calculation unit 11. The imaging information calculation unit 11 acquires the first image 5 input from the first camera 2 and the second images 6a to 6c input from the second cameras 3a to 3c. The imaging information calculation unit 11 calculates the coordinate positions of the second images 6a to 6c with respect to the first image 5. In addition, the imaging information calculation unit 11 calculates differences of the imaging directions of the second cameras 3a to 3c with respect to the imaging direction of the first camera 2 on the basis of the second images 6a to 6c. The differences of these coordinate positions and the imaging directions are termed "imaging information".

In addition, the image processing apparatus 10 includes a zoom conversion unit 12. The zoom conversion unit 12 zooms portions of the first image 5 corresponding to the coordinate positions of the second images 6a to 6c on the basis of the coordinate positions calculated by the imaging information calculation unit 11 to generate low-frequency images 7.

In addition, the image processing apparatus 10 includes an eyepoint conversion unit 13. The eyepoint conversion unit 13 converts the eyepoints of the second cameras 3a to 3c into the eyepoint of the first camera 2 on the basis of the differences of the imaging directions calculated by the imaging information calculation unit 11 to generate eyepoint conversion images. Here, the "eyepoint" of each camera is located in the corresponding imaging direction. Normally, the second cameras 3a to 3c are placed in imaging direction having predetermined angles with respect to the imaging direction of the first camera 2. Then, a point at which the imaging direction of the first camera 2 meets the imaging direction of each of the second cameras 3a to 3c may be virtually used as a single eyepoint of the cameras. At this time, the eyepoint conversion unit 13 generates an ideal image captured with the single eyepoint of the cameras as an eyepoint conversion image. Then, the eyepoint conversion unit 13 matches the low-frequency image 7 with the eyepoint conversion image to calculate a deviation in phase of the eyepoint conversion image with respect to the low-frequency image 7.

In addition, the image processing apparatus 10 includes an image synthesizing unit 14. The image synthesizing unit 14 pastes high-frequency images 9a to 9c to the coordinate positions corresponding to the low-frequency images 7. The high-frequency images 9a to 9c are formed of frequency components higher than or equal to a predetermined frequency band. At this time, the image synthesizing unit 14 pastes the high-frequency images 9a to 9c, extracted from the second images 6a to 6c, at the coordinate positions corresponding to the low-frequency images 7 so as to eliminate deviations of the eyepoint conversion images with respect to the low-frequency images 7, thus generating a synthesized image.

The eyepoint conversion unit 13 includes a band separation unit 15. The band separation unit 15 separates frequency components lower than a predetermined frequency band from the second images 6a to 6c to generate low-frequency images 8a to 8c. The low-frequency images 8a to 8c are matched in frequency band with the low-frequency images 7. The band separation unit 15 functions as a low-pass filter that generates an image of which the frequency is lower than a predetermined frequency band. The eyepoint conversion unit 13 includes a matching unit 16. The matching unit 16 matches the low-frequency images 8a to 8c at the coordinate positions corresponding to the low-frequency images 7 supplied from the zoom conversion unit 12. In addition, the eyepoint conversion unit 13 includes a compensation vector calculation unit 17. The compensation vector calculation unit 17 calculates deviations in phase of the low-frequency images 8a to 8c corresponding to the low-frequency images 7 matched by the matching unit 16 as compensation vectors, and supplies the compensation vectors to the image synthesizing unit 14.

The image synthesizing unit 14 includes a subtracting unit 18. The subtracting unit 18 subtracts the frequency components of the low-frequency images 8a to 8c separated by the band separation unit 15 from the frequency components of the second images 6a to 6c to generate the high-frequency images 9a to 9c. The high-frequency images 9a to 9c are formed of frequency components higher than or equal to a predetermined frequency band. In addition, the image synthesizing unit 14 includes a mapping unit 19. The mapping unit 19 corrects the deviations in phase of the images on the basis of the compensation vectors supplied from the compensation vector calculation unit 17, and generates a synthesized image in which the high-frequency images 9a to 9c are mapped at the positions corresponding to the low-frequency images 7. The synthesized image generated by the mapping unit 19 is output to the display device 20 (see FIG. 1).

Here, an example of operations of the processing blocks will be described. First, the imaging information calculation unit 11 measures a correlation among the images on the basis of the frequency components included in the first image 5 and the second images 6a to 6c. Here, the "correlation" indicates a positional relationship of the second images 6a to 6c with respect to the first image 5. Then, the imaging information calculation unit 11 calculates the coordinate positions of the second images 6a to 6c with respect to the first image 5. In addition, the imaging information calculation unit 11 calculates the imaging directions of the second cameras 3a to 3c with respect to the imaging direction of the first camera 2. The imaging information calculation unit 11 calculates zoom rates for adjusting the angles of view to the imaging areas corresponding to the second images 6a to 6c within the first image 5 to zoom portions of the first image 5. The imaging information calculation unit 11 supplies the calculated zoom rates to both the zoom conversion unit 12 and the band separation unit 15.

At this time, the imaging information calculation unit 11 obtains information about which portions of the first image 5 are enlarged for the second images 6a to 6c through matching. As the matching is performed, the phases of the second images 6a to 6c deviate from the phase of the first image 5 depending on distances from the second cameras 3a to 3c to a subject. In the present embodiment, using the technique, such as DRC, even the second cameras 3a to 3c are also able to acquire high-resolution images as captured at the eyepoint of the first camera 2.

In addition, in order to calculate the coordinates and zoom rates of the second images 6a to 6c with respect to the first image 5, for example, a technique using Fourier transform and a phase correlation as described in "An FFT-Based Technique for Translation, Rotation, Scale-Invariant Image Registration, IEEE Transaction on Image Processing", vol 5 no 8 August 1996 may be used. As a result, the imaging information calculation unit 11 is able to acquire the coordinate values and the zoom rates.

The zoom conversion unit 12 generates the low-frequency images 7, which are obtained by zooming the pixel areas of the first image 5 corresponding to the second images 6a to 6c, on the basis of the coordinate positions and zoom rates supplied from the imaging information calculation unit 11.

The band separation unit 15 zooms the second images 6a to 6c on the basis of the zoom rates supplied from the imaging information calculation unit 11. The zoom rates are variable, and are different among the second images 6a to 6c. In addition, the band separation unit 15 recognizes how much a low-pass filter is applied to the second images 6a to 6c makes the frequency bands of the generated low-frequency images 8a to 8c coincide with the frequency band of the first image 5 on the basis of the zoom rates. For example, it is assumed that portions of the first image 5 are zoomed on the basis of the zoom rates supplied from the imaging information calculation unit 11 to generate the low-frequency images 7.

The imaging information calculation unit 11 initially obtains information about where the image frames of the second images 6a to 6c are located in the first image 5 (see FIG. 18, which will be described later). From the above information, the imaging information calculation unit 11 recognizes that, for example, the zoom rates of the second images 6a to 6c are eight times with respect to the first image 5. That is, when the zoom rate is eight times in vertical direction and horizontal direction, the band separation unit 15 applies a low-pass filter in which a value ($1/8$), which is an inverse number of the zoom rate, is multiplied by the frequency components of the second images 6a to 6c. As a result, the second images 6a to 6c become the low-frequency images 8a to 8c of which the band is reduced to $1/8$. Note that the maximum frequency (or average frequency) calculated for the second images 6a to 6c or each of 32×32 blocks may be used as a band with respect to which a low-pass filter is applied.

The matching unit 16 matches the low-frequency images 7 with the low-frequency images 8a to 8c. At this time, the matched low-frequency images 7 differ among the low-frequency images 8a to 8c. In the present embodiment, 32×32 (pixel) block matching is performed for each pixel. Then, the compensation vector calculation unit 17 calculates compensation vectors through the block matching performed by the matching unit 16. As a result, the eyepoints of the second cameras 3a to 3c may coincide with the eyepoint of the first camera 2.

The compensation vector calculation unit 17 calculates deviations in phase between the frequency components included in the low-frequency images 7 and the low-frequency images 8a to 8c as compensation vectors. As the compensation vectors are calculated, it turns out the deviations of the subjects of the low-frequency images 8a to 8c with respect to the subjects included in the low-frequency images 7. The subtracting unit 18 respectively subtracts the low-frequency images 8a to 8c from the second images 6a to 6c. As a result, the high-frequency images 9a to 9c formed of only high-frequency components are obtained.

The mapping unit 19 corrects the deviations of the high-frequency images 9a to 9c with respect to the low-frequency images 7 on the basis of the compensation vectors calculated by the compensation vector calculation unit 17, while mapping the high-frequency images 9a to 9c at the coordinate positions corresponding to the low-frequency images 7. Through the above mapping, it is possible to mix the low-frequency component of the first image 5 with the high-frequency components of the second images 6a to 6c. Then, when only the high-frequency luminance components are mapped while using a color component included in the first image 5, the color of the synthesized image does not degrade. Then, the mapping unit 19 outputs the generated synthesized image to the display device 20.

The image processing apparatus 10 according to the present embodiment performs a process of using strong attributes between the cameras. Here, it is assumed that the first image 5 is captured by the first camera 2 of which the resolution is low and the eyepoint becomes a reference and the second image 6a is captured by the second camera 3a of which the resolution is high and has a parallax with respect to the reference eyepoint. In this case, a high-resolution image is generated while the eyepoint is adjusted to the first camera 2. Through the above process, it is possible to obtain a synthesized image that incorporates the attribute that the resolution of the second image 6a is high and the attribute that the eyepoint of the first camera 2 is used as a reference.

Similarly, it is assumed that, on the condition that a luminance common to the first camera 2 and the second camera 3a is set, the first image 5 has a low resolution and the second image 6a has a deviated luminance (camera individual difference) and has a high resolution. In this case, it is possible to generate a high-resolution image with a luminance common to the other cameras (second cameras 3b and 3c) as an output image.

Figure 3:
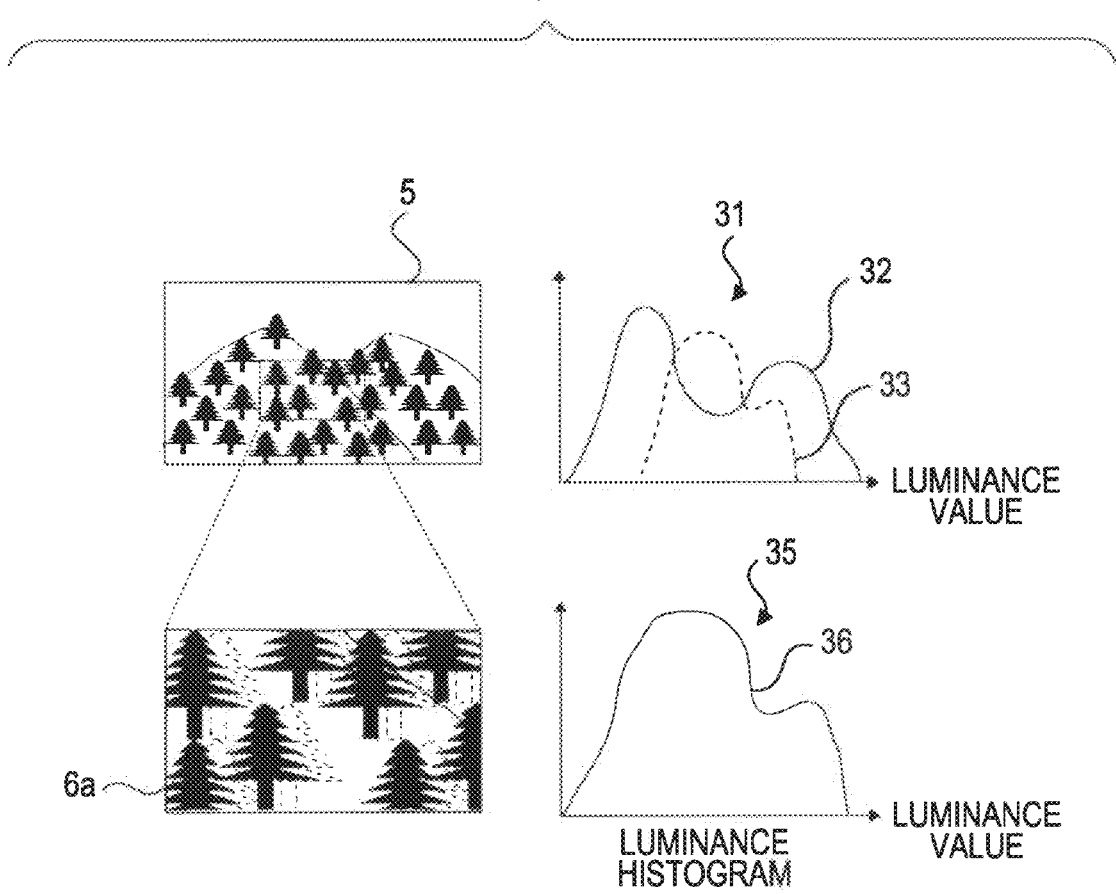
FIG. 3 is a view that illustrates an example of a luminance distribution of each image in the embodiment of the invention.

FIG. 3 shows an example of a luminance distribution using luminance histograms of the first image 5 and the second image 6a. The luminance of the first image 5 is shown as a luminance histogram 31. The luminance histogram 31 shows a luminance distribution 32 over the entire first image 5 and a luminance distribution 33 of a range in which the second image 6a is captured. The luminance of the overall second image 6a is shown as a luminance histogram 35. The luminance distributions 33 and 36 have different scales but represent the same luminance distribution.

As shown in the luminance histogram 31, only with the first camera 2, if a subject has a high luminance or a subject has a wide dynamic range, a non-imageable portion due to insufficient grayscale may possibly occur. In the example shown in FIG. 3, around the middle luminance value of the luminance distribution 32, a luminance is insufficient as compared with the luminance distribution 36. For this reason, when the images 6a to 6c captured by the second cameras 3a to 3c are superimposed on the first image 5, it is possible to reproduce a luminance of the original subject. Then, because detailed luminance information may be obtained, an image may be displayed on a display device in larger bits as compared with the first camera 2, or an image may be adjusted.

Figure 4:
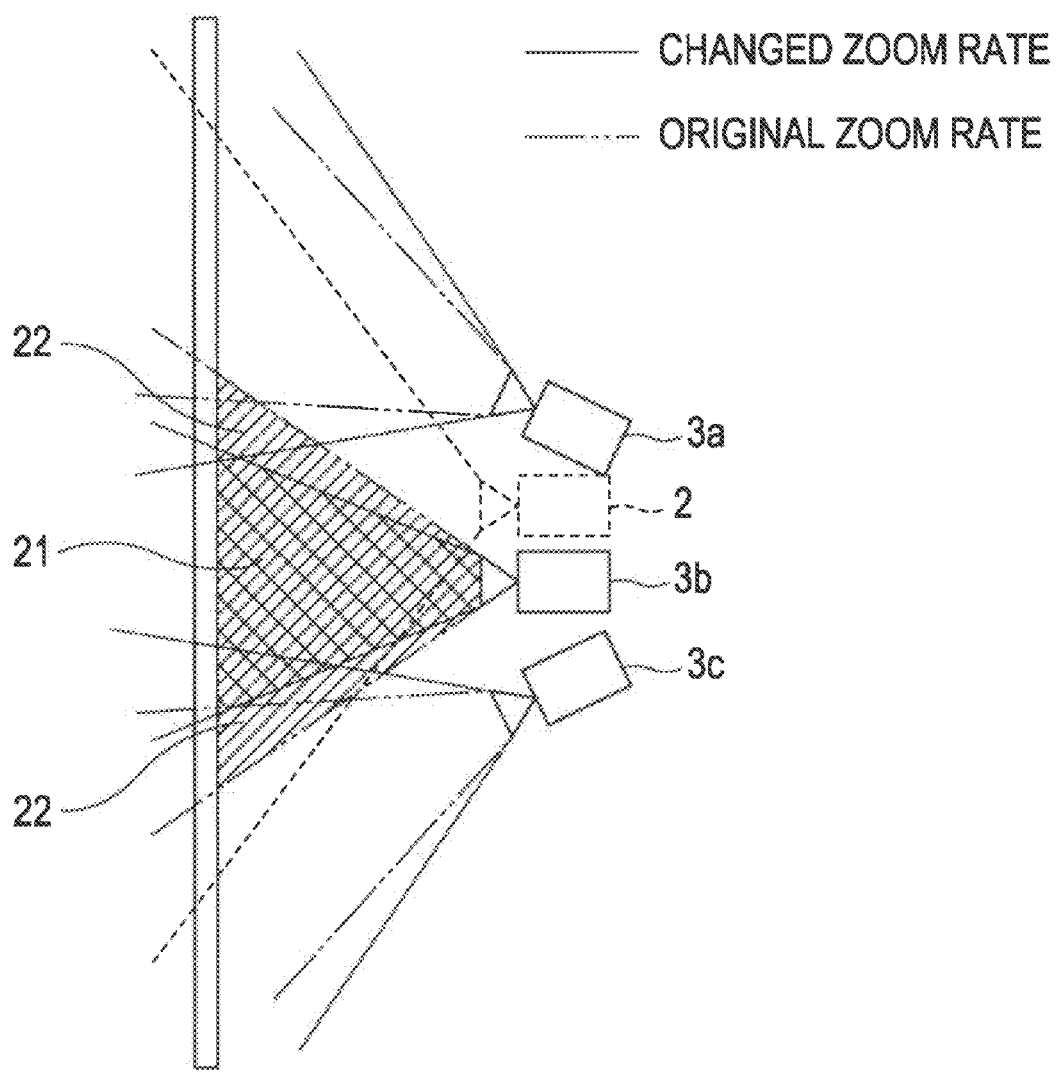
FIG. 4 is a view that illustrates an example of a variation in zoom rate in the embodiment of the invention.

FIG. 4 is an example of angles of view due to a variation in zoom rate. In FIG. 4, arrangement of the first camera 2 and the second cameras 3a to 3c is similar to that of FIG. 1. For example, when a subject is viewed in detail, the second camera 3b zooms in and the other second cameras 3a and 3c zoom out. Then, when a moving object is found within a range that is captured by the first camera 2 in a wide range, the second camera 3b zooms in to make it possible to capture the object. Thus, it may be necessary to allow the zoom rate to be changed camera by camera.

In addition, a low-resolution image may be partially obtained from an image of a wide range captured by the first camera 2. Thus, when the imaging ranges of the second cameras 3a to 3c are not continuous, the first image 5 captured by the first camera 2 is put in a gap between the adjacent imaging ranges to make it possible to generate a synthesized image. In addition, when a subject is mainly captured, the zoom rates of the second cameras 3a to 3c are changed. To detect the subject, a high-pass filter is applied to a captured image to obtain an image formed of a high-frequency component. In this image, a large amount of high-frequency components are included in an area that includes fine patterns, and the like. After that, by changing the zoom rates and image frames to capture an area that includes a large amount of high-frequency components, it is possible to capture the area that includes fine patterns, and the like, with an increased resolution.

In the present embodiment, because an image captured by the first camera 2 is used as a reference when images are synthesized, the zoom rate of the first camera 2 is not changed. Thus, the angle of view of the first camera 2 is not changed. On the other hand, the angles of view of the second cameras 3a to 3c when the respective zoom rates are changed are narrower than the angles of view of the original zoom rates. Thus, an area 21 after the zoom rate is changed is narrower than an imageable area 22 at the original zoom rate; however, a further higher-resolution image may be obtained.

Then, the matching unit 16 obtains pieces of information related to at least any one of color, luminance and focus as parameters by which the characteristic amounts of the low-frequency images 8a to 8c with respect to the low-frequency images 7 are determined pixel by pixel. In this way, by changing the characteristics of the second cameras 3a to 3c using the parameters, insufficient pieces of information in the images captured by the respective cameras may be complemented. Information complemented at this time is termed "parameter". The parameter includes resolution, luminance, focus, white balance, eyepoint, or the like. Hereinafter, the parameter will be described.

(1) In the Case of Resolution

The second cameras 3a to 3c each change the zoom rate to be able to perform capturing by freely changing the resolution for each imaging area.

(2) In the Case of Eyepoint

The second cameras 3a to 3c each are able to perform capturing by freely changing the eyepoint in accordance with a target subject.

(3) In the Case of White Balance (Chromaticness)

The second cameras 3a to 3c each are able to perform capturing by freely changing the white balance for each imaging area in accordance with the color of a subject.

(4) In the Case of Luminance

The second cameras 3a to 3c each are able to perform capturing by freely changing the luminance for each imaging area using auto gain, or the like.

(5) In the Case of Focus

The second cameras 3a to 3c each are able to perform capturing by freely changing the focus for each imaging area in accordance with a distance to a subject.

The second cameras 3a to 3c each change the resolution and the luminance for each imaging area depending on a zoom rate. Then, the focus is changed for each imaging area in accordance with a distance to a subject, and the white balance is changed for each imaging area in accordance with the color of an image captured, thus changing the eyepoint to the subject.

FIG. 5A and FIG. 5B show an example of common information and individual information. In the present embodiment, information related to the parameter of the first camera 2 is termed "common information". The common information is used as a reference over the first camera 2 and the second cameras 3a to 3c overall, and mainly indicates differences of the second cameras 3a to 3c with respect to the first camera 2. When the common information is used, it is possible to remove the influence of the individual difference, parallax, and the like, of each camera when a plurality of images captured by the cameras are pieced. However, the common information may be obtained by capturing a wide range, so the resolution is extremely low.

On the other hand, information related to the parameters of the second cameras 3a to 3c with respect to the common information is termed "individual information". The individual information differs from the common information of the camera array overall but the quality of information (resolving power of resolution, resolving power of luminance, resolving power of chromaticness, location at which a focus is adjusted, or the like) is high. As described above, the common information has a high quality of information, such as resolution, in contrast to the individual information, but an individual difference among the cameras is not considered. Then, the common information and the individual information are related to a plurality of cameras, so they are managed by the imaging information calculation unit 11. By obtaining a difference of the individual information with respect to the common information, a variation in parameter of each of the second cameras 3a to 3c with respect to the first camera 2 turns out. Then, the turned-out variation in parameter is used to, for example, correct a deviation and/or chromaticness of an image when the image synthesizing unit 14 synthesizes images.

FIG. 5A shows an example of how the common information and the individual information are managed. In the present embodiment, the second images 6a to 6c are superimposed using the eyepoint of the first camera 2 and the chromaticness of the first image 5 as a reference. Because the angle of view of the first camera 2 is wide, the first image 5 has a low resolution. On the other hand, the second cameras 3a to 3c each have a narrow angle of view, and zoom a portion of the first image 5 for capturing, so the second images 6a to 6c each have a high resolution. The eyepoint, chromaticness, luminance and focus of the first camera 2 are used as the common information that is used as a reference when the second images 6a to 6c are superimposed on the first image 5. In addition, the chromaticness, luminance and focus of the second cameras 3a to 3c differ in characteristic among cameras.

FIG. 5B shows an example of information generated using both the common information and the individual information. The individual information is related to resolution, eyepoint, chromaticness, luminance and focus that are used to match the characteristics of the second cameras 3a to 3c with the first camera 2. In the present embodiment, it is desirable to obtain an image of a high resolution equivalent to those of the second cameras 3a to 3c. In addition, when the location at which the first camera 2 is placed is set as one eyepoint, locations at which the second cameras 3a to 3c are placed are made to coincide with the eyepoint of the first camera 2. Then, in comparison with the low-resolution first image 5, the second images 6a to 6c each have detailed color information. In addition, in comparison with the first image 5 that only has low-luminance luminance information, the second images 6a to 6c each have high-luminance luminance information. In addition, the second cameras 3a to 3c each focus on a corresponding imaging area that includes a subject.

In the existing art, when a plurality of cameras that capture a subject at a narrow angle of view are arranged and then images are pieced together, because the eyepoints of the cameras are different, a joint between the images appears to be unnatural. In the present embodiment, the first camera 2 and the second cameras 3a to 3c are prepared, and the common information and individual information of a subject are captured separately. The common information and the individual information include information of resolution, eyepoint, chromaticness, luminance and focus. When the common information and the individual information are used, an image that utilizes the characteristic of each camera is obtained.

Figure 6:
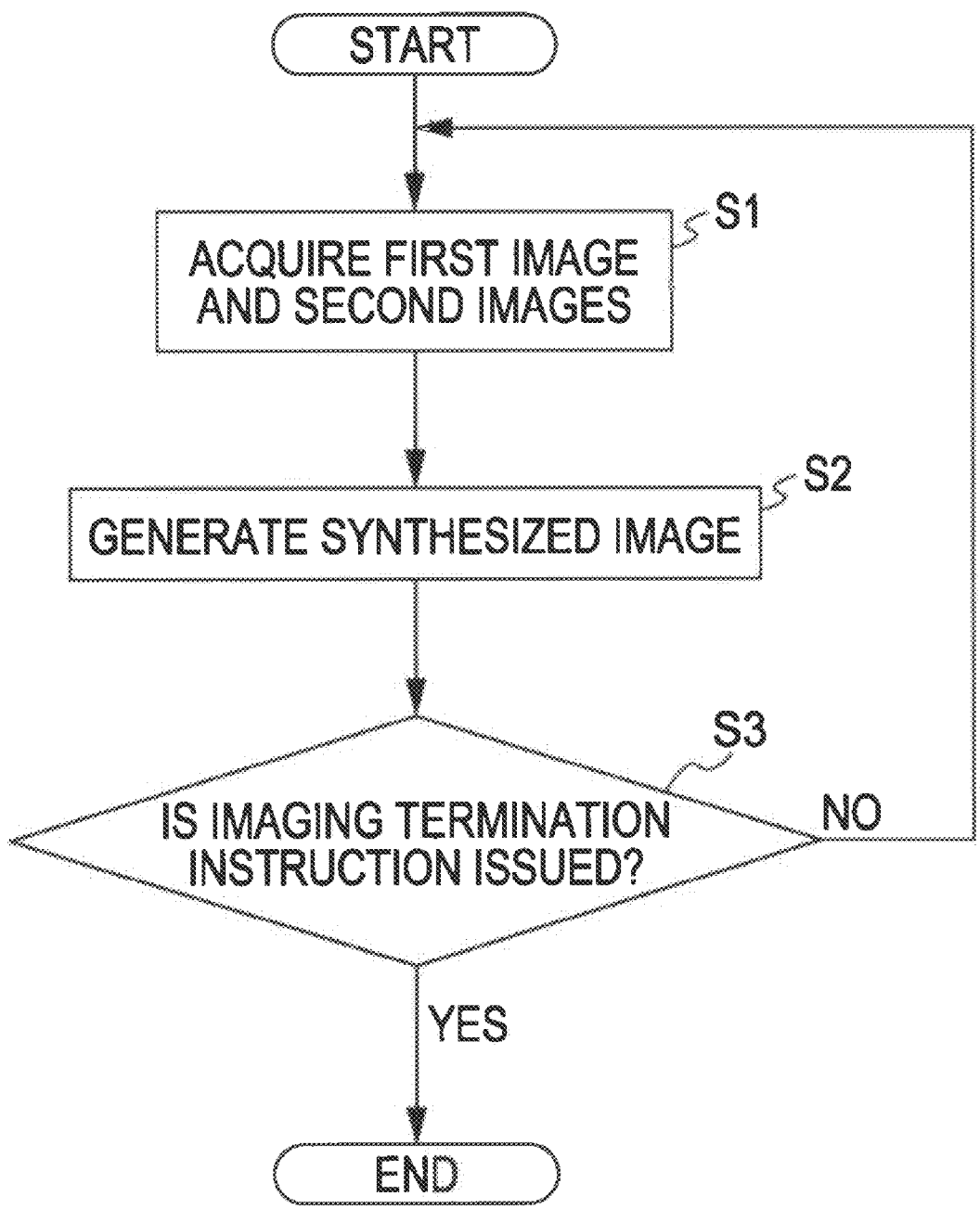
FIG. 6 is a flowchart that shows an example of a process of generating a synthesized image in the embodiment of the invention.

FIG. 6 is a main flowchart that shows an example of a process of generating a synthesized image. First, the image processing apparatus 10 acquires the first image 5 from the first camera 2, and acquires the second images 6a to 6c from the second cameras 3a to 3c (step S1).

Subsequently, the image processing apparatus 10 generates a synthesized image on the basis of the first image 5 and the second images 6a to 6c (step S2). Then, the image processing apparatus 10 determines whether an imaging termination instruction is issued by a user (step S3).

The imaging termination instruction is issued by using a remote control device (not shown) or an operation button of the image processing apparatus. When the imaging termination instruction is issued, the image processing apparatus 10 ends the process of generating a synthesized image. On the other hand, when no imaging termination instruction is issued, the image processing apparatus 10 continues a process of generating a synthesized image.

Figure 7:
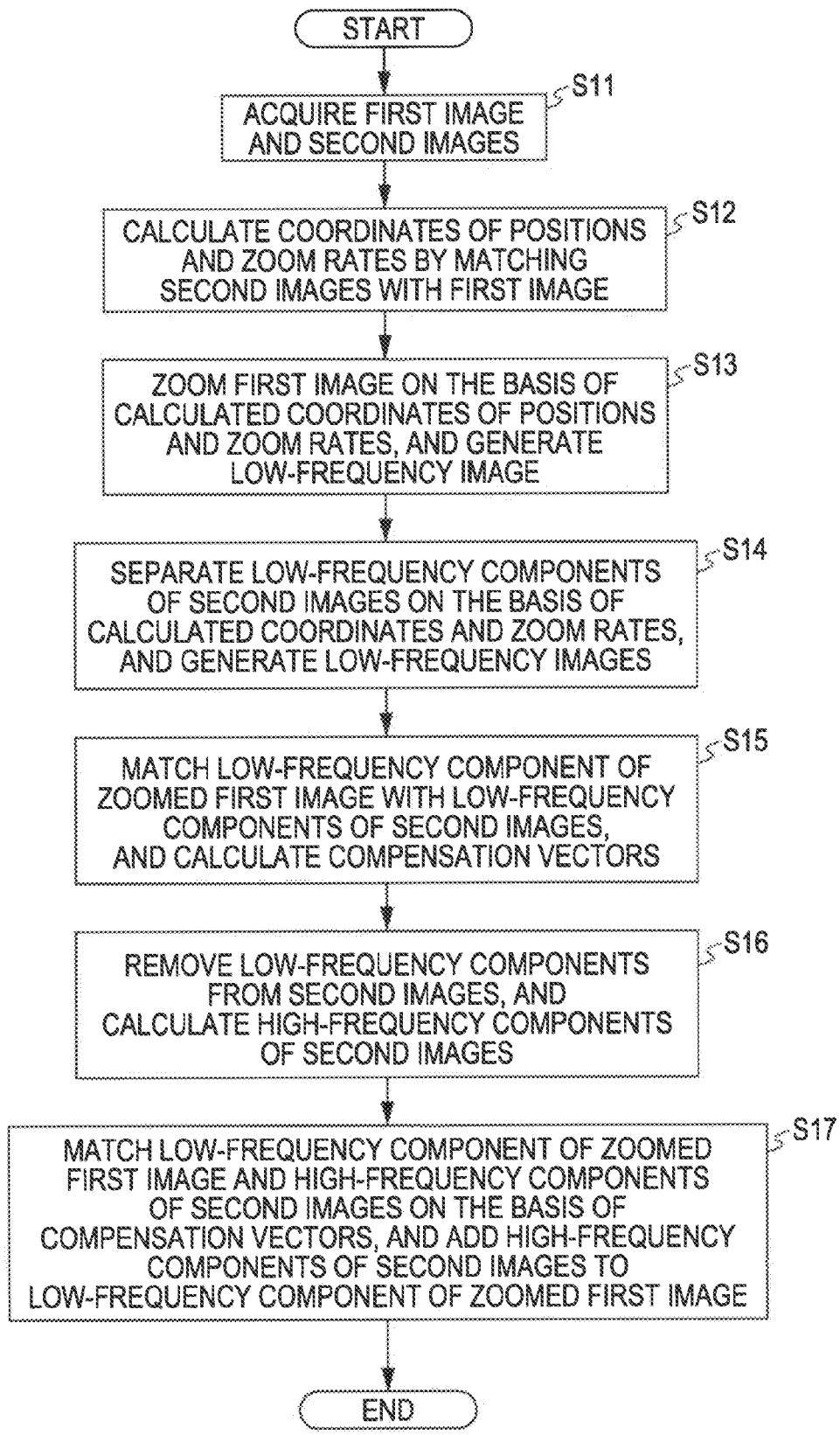
FIG. 7 is a flowchart that shows an example of a process of generating a synthesized image in the embodiment of the invention.

FIG. 7 is a flowchart that shows a process of generating a synthesized image. First, the image processing apparatus 10 acquires the first image 5 from the first camera 2, and acquires the second images 6a to 6c from the second cameras 3a to 3c (step S11).

Subsequently, the imaging information calculation unit 11 matches the second images 6a to 6c with the first image 5, and calculates the eyepoint of the first camera 2, the coordinates of the second images 6a to 6c with respect to the first image 5 and the zoom rates of portions of the first image 5 with respect to the second images 6a to 6c (step S12). At this time, the imaging information calculation unit 11 calculates the coordinates using the technique such as the above described phase correlation.

After that, the zoom conversion unit 12 zooms the portions of the first image 5 included in the portions captured in the second images 6a to 6c on the basis of the calculated coordinates and zoom rates to generate the low-frequency images 7 (step S13). On the other hand, the band separation unit 15 separates the low-frequency components of the second images 6a to 6c on the basis of the calculated coordinates and zoom rates to generate the low-frequency images 8a to 8c (step S14).

Subsequently, the compensation vector calculation unit 17 matches the low-frequency images 7 with the low-frequency images 8a to 8c and calculates compensation vectors (step S15). Then, the subtracting unit 18 obtains the high-frequency images 9a to 9c that are obtained by removing the low-frequency components (low-frequency images 8a to 8c) from the second images 6a to 6c (step S16).

Thereafter, the mapping unit 19 matches the high-frequency images 9a to 9c with the low-frequency images 7 on the basis of the compensation vectors, and adds the high-frequency images 9a to 9c to the low-frequency images 7 to generate a synthesized image (step S17).

Incidentally, when pixels are moved on the basis of the compensation vectors for each pixel, a synthesized image is not obtained even when linear mapping is simply used. For this reason, the image processing apparatus 10 according to the present embodiment obtains a synthesized image by performing "non-linear pixel calculation". In addition, adding the pixels of the high-frequency images 9a to 9c to the corresponding pixels of the low-frequency images 7 is termed "mixing the low-frequency pixels with the high-frequency pixels". Note that "adding the pixels" means adding luminance values. When the accuracy of each compensation vector is poor, as the high-resolution images are directly pasted onto the low-frequency images, a deviation of an image increases and the synthesized image tends to appear to be unnatural. However, by using the low-frequency images 7 capturing a wide range as a reference, it is less likely to appear to be an unnatural synthesized image even when calculated compensation vectors are deviated.

Here, the "linear mapping" means that linearity is ensured in addition and multiplication. The linear mapping has such a feature that a converted image is returned to an image before conversion by applying inverse transformation. Calculation that converts the entire image using a certain parameter, such as affine transform, corresponds to the linear mapping.

In the image processing apparatus 10 according to the present embodiment, the amount of movement of an object varies depending on a distance between a camera and the object. Therefore, when an occlusion occurs between two or more objects, it is difficult to perform image transformation using only one parameter like affine transform. Furthermore, it may be necessary to arbitrarily change a value of a compensation vector pixel by pixel or block by block, so image transformation is nonlinearly performed. In addition, to eliminate a parallax of an object A in which an occlusion occurs, when an image of an object B is overwritten onto an image of the object A, the image (pixels) of the object A disappears. Therefore, even when inverse transformation is simply applied to the above transformed image, it does not return to the original image (for example, object A).

Then, as the compensation vector varies depending on components of the image, such as each of a plurality of objects, each block and each pixel, an appropriate synthesized image is not obtained only by performing image transformation using linear mapping. Then, the image processing apparatus 10 according to the present embodiment adds the luminance values of the high-frequency components of the high-resolution second images 6a to 6c to the low-resolution first image 5 to obtain a synthesized image (see FIG. 11, which will be described later). However, it is also applicable that the luminance values of the second image 6a and the luminance values of the low-frequency component of the second image 6a are multiplied by the luminance values of the first image 5 by a selected factor to obtain the luminance values of the synthesized image. Note that the "luminance value" means a luminance of one pixel, and the luminance value of each pixel may be expressed on a luminance graph, which will be described later. In addition, the "luminance value" may be referred to as "pixel value" where appropriate.

Here, an example of the luminance values of each image and adding a plurality of luminance values will be described with reference to FIG. 8 to FIG. 14. In the following luminance graphs, the abscissa axis represents an x-coordinate that indicates the coordinate of a pixel on the horizontal line in the first image 5 or in the second image 6a, and the ordinate axis represents a luminance. The broken lines indicated at predetermined intervals represent an interval between adjacent pixels on the x-coordinate. Note that, for the second images 6b and 6c as well, luminance graphs are obtained similarly, and the second images 6b and 6c are pasted onto the first image 5; however, only the second image 6a will be described here.

Figure 8:
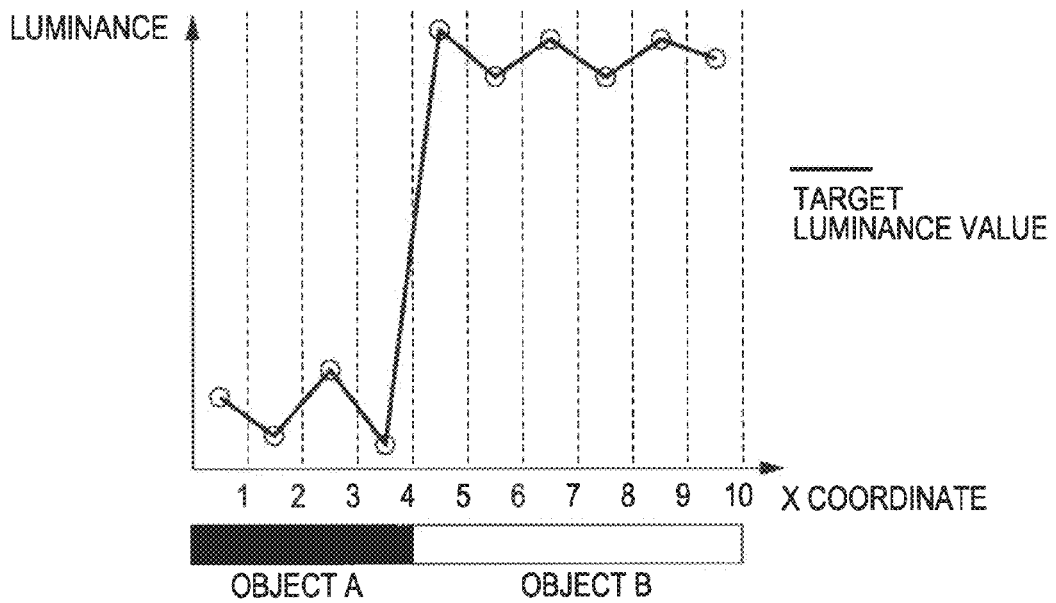
FIG. 8 is a view that illustrates an example of a luminance graph of an image that is intended to be generated in the embodiment of the invention.

FIG. 8 is an example of a luminance graph, indicated by a target luminance value, of a synthesized image generated by the image processing apparatus 10. The image processing apparatus 10 performs image synthesizing process to include a wide range as in the case of the first image 5, while setting the luminances of a high-resolution image as target luminance values. The target luminance values may not be directly obtained from a captured image; however, the target luminance values may be obtained from the generated synthesized image.

First, a case where a dark object A and a bright object B are arranged side by side on the x-coordinate as subjects will be considered. The target luminance values of the synthesized image generated by the image processing apparatus 10 are expressed by the histogram shown in FIG. 8. A state where the objects A and B are actually seen is shown on the lower side of the luminance graph in a simplified manner. From FIG. 9, the boundary between the objects A and B is clear, and the contrast ratio is high, so it is found that the luminance graph is low at the coordinate positions in which the object A is included and is high at the coordinate positions in which the object B is included. Then, the luminance value abruptly increases around the boundary between the objects A and B.

Figure 9:
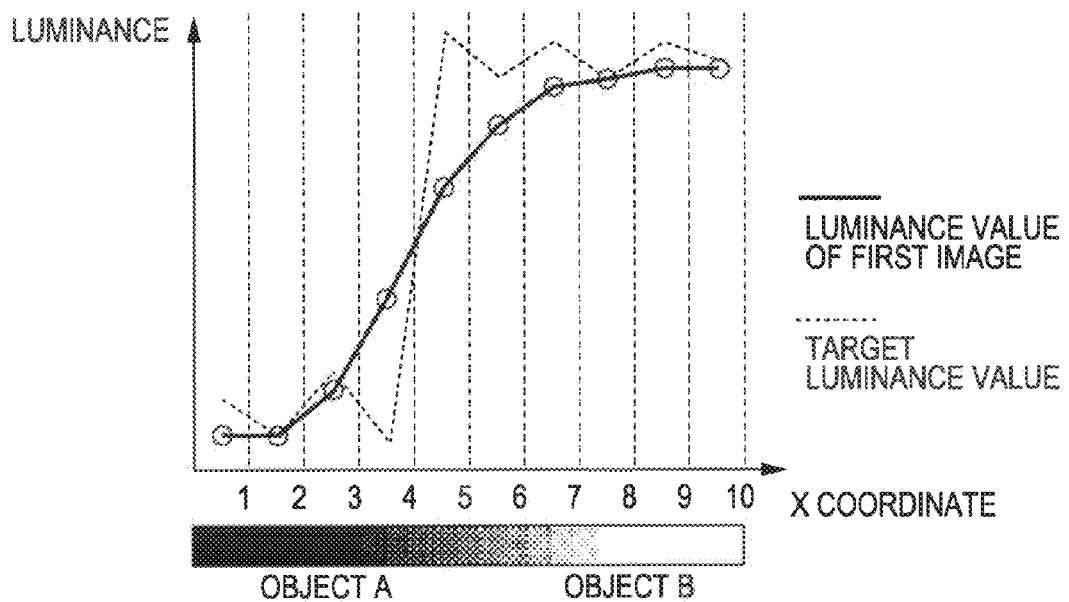
FIG. 9 is a view that illustrates an example of a luminance graph of a first image in the embodiment of the invention.

FIG. 9 is an example of the luminance graph of the first image 5. In FIG. 9, the luminance graph of the first image 5 is indicated by the solid line, and the luminance graph of the target luminance values is indicated by the broken line. Because the first image 5 has a low resolution, the boundary between the objects A and B is unclear. Therefore, in the luminance graph of the first image 5, the luminance value gradually increases around the boundary between the objects A and B.

Figure 10:
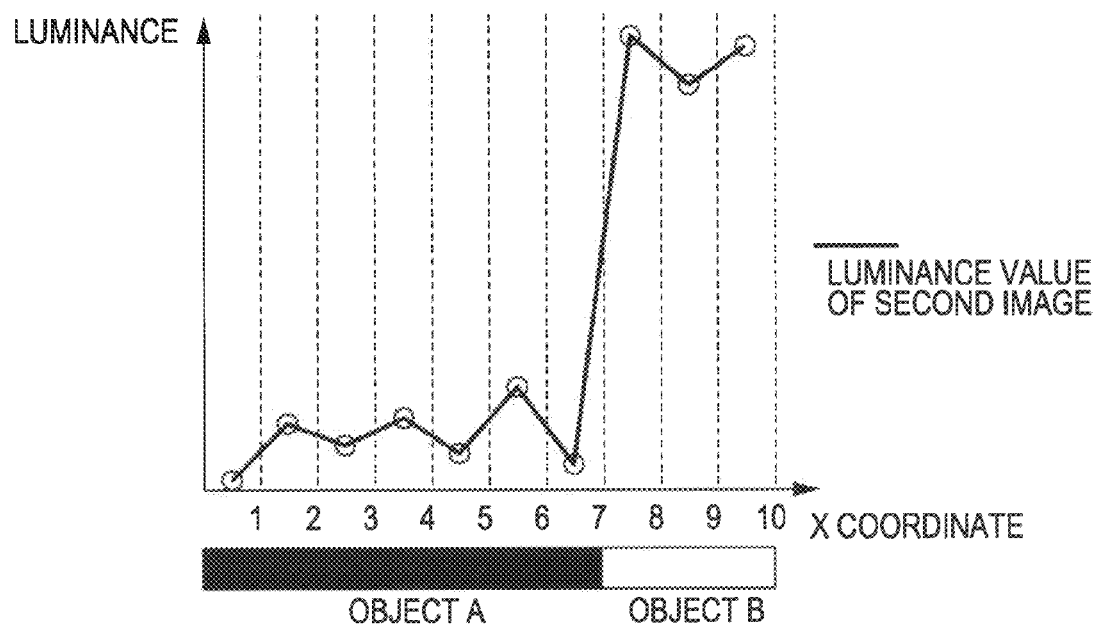
FIG. 10 is a view that illustrates an example of a luminance graph of a second image in the embodiment of the invention.

FIG. 10 is an example of the luminance graph of the second image 6a. In FIG. 10, the luminance graph of the second image 6a is indicated by the solid line. If the second image 6a in the present embodiment is captured by focusing on the object A, the image of the object A is mostly included in the second image 6a. Then, because the objects A and B are captured as a high-resolution image, the luminance around the boundary between the objects A and B abruptly varies. That is, the contrast ratio between the objects A and B is high.

Figure 11:
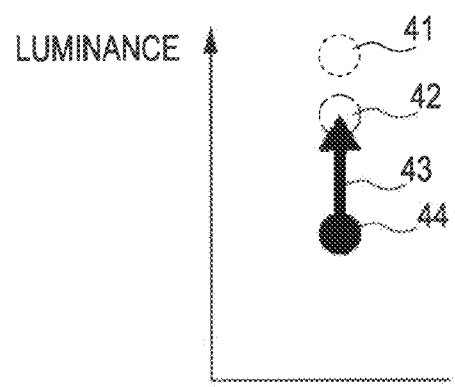
FIG. 11 is a view that illustrates an example of adding a luminance value in the embodiment of the invention.

FIG. 11 shows an example of adding luminance values. Here, an example in which one luminance value of a coordinate of the first image 5 and one luminance value of the corresponding coordinate of the second image 6a are added will be described. A target luminance value 41 indicates an ideal luminance value obtained when an imaging area shown by the first image 5 is captured. Then, a difference value 43 of a high-frequency component of the second image 6a is added to a luminance value 44 of the first image 5 to obtain a luminance value 42 of the synthesized image.

Figure 12:
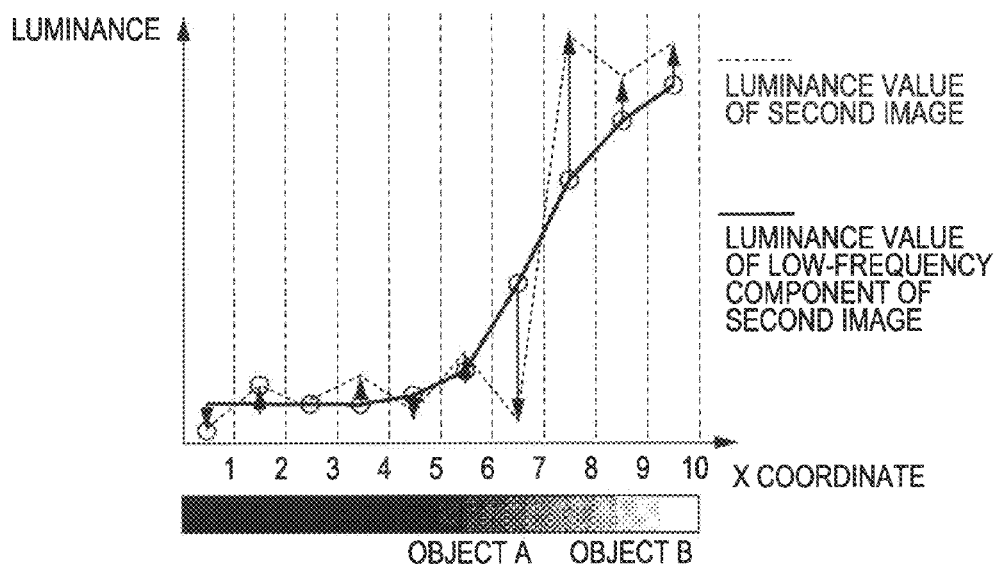
FIG. 12 is a view that illustrates an example of a luminance graph of an image that is obtained by applying a low-pass filter to a second image in the embodiment of the invention.

FIG. 12 shows an example of a luminance graph of an image that is obtained by applying a low-pass filter to the second image 6a. In FIG. 12, the luminance graph of the second image 6a is indicated by the broken line, and the luminance graph of the low-frequency component of the second image 6a is indicated by the solid line. Then, in x-coordinates, differences of the luminance values of the low-frequency component of the second image 6a with respect to the luminance values of the second image 6a are indicated by upward and downward arrows as difference values. In the present embodiment, it is found that the band separation unit 15 is used to extract the low-frequency component of the second image 6a, so the unevenness of the luminance graph of the second image 6a shown in FIG. 10 is moderated.

Figure 13:
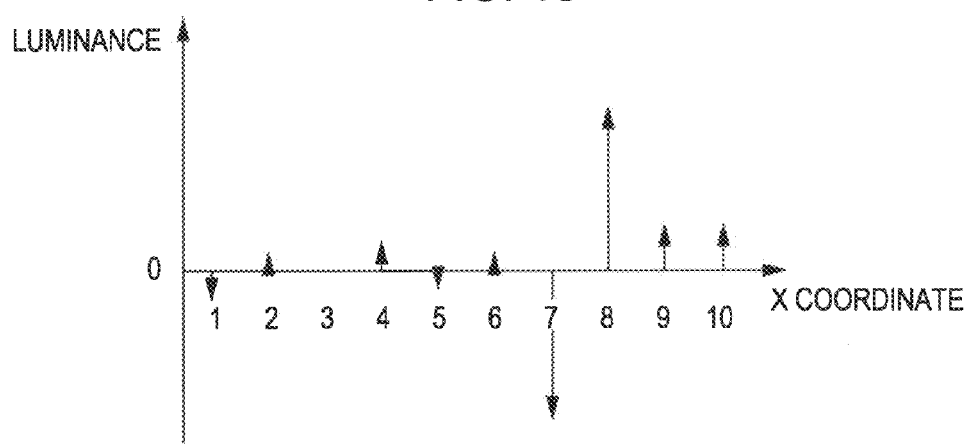
FIG. 13 is a view that illustrates an example of a luminance value of a high-frequency component (difference) in the embodiment of the invention.

FIG. 13 shows an example of a high-frequency component obtained as difference values. In FIG. 13, the difference values shown in FIG. 12 are shown for each x-coordinate. Here, when the high-frequency component obtained by subtracting the luminance value of the low-frequency component of the second image 6a from the luminance value of the second image 6a is positive, the luminance is higher than zero; whereas, when the high-frequency component is negative, the luminance is lower than zero.

Figure 14:
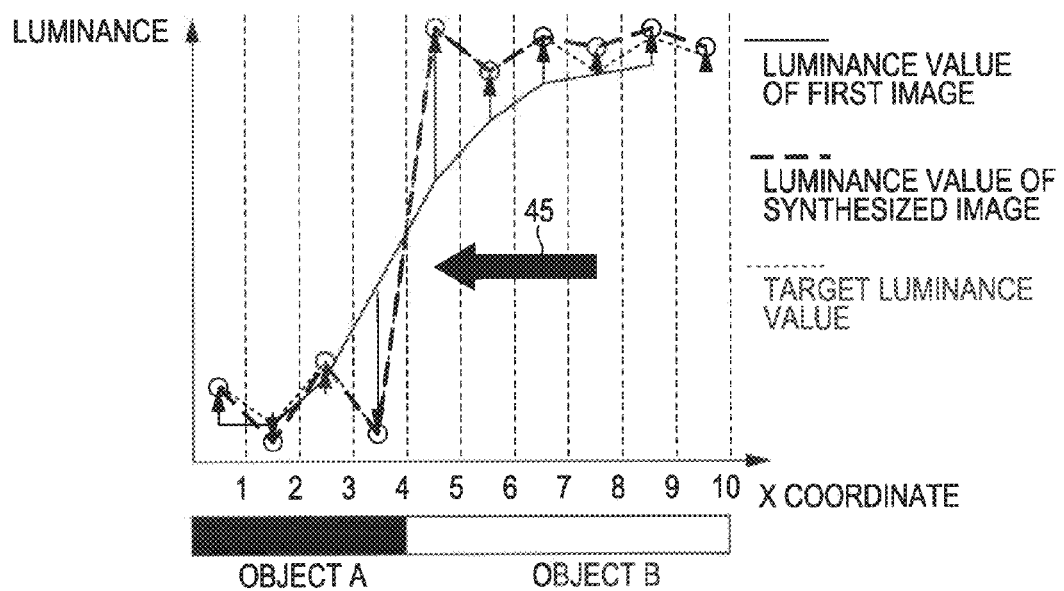
FIG. 14 is a view that illustrates an example of a luminance graph when high-frequency components of the second image are pasted onto the first image in the embodiment of the invention.

FIG. 14 shows an example of the luminance graph when the high-frequency component of the second image 6a is pasted onto a predetermined position on the first image 5. In FIG. 14, the luminance graph of the first image 5 is indicated by the solid line, the luminance graph of the synthesized image is indicated by the wide broken line, and the luminance graph of the target luminance values is indicated by the narrow broken line. An arrow 45 indicates a compensation vector. The luminance values of the synthesized image are obtained by adding the high-frequency component obtained in FIG. 13 to the luminance graph of the first image 5 obtained in FIG. 9. At this time, it is found that the luminance graph of the synthesized image substantially coincides with the luminance graph of the target luminance values. Thus, an image that captures a wide range with a high resolution and a high contrast is obtained.

Here, an example of a process of matching performed by the image processing apparatus 10 according to the present embodiment will be described with reference to FIG. 15A to FIG. 17B. Here, a method in which a compensation vector is shifted every predetermined pixels to match images will be described. The method has such a feature that it is possible to effectively use a square error of the luminance values of the synthesized image with respect to the target luminance values.

Figure 15A:
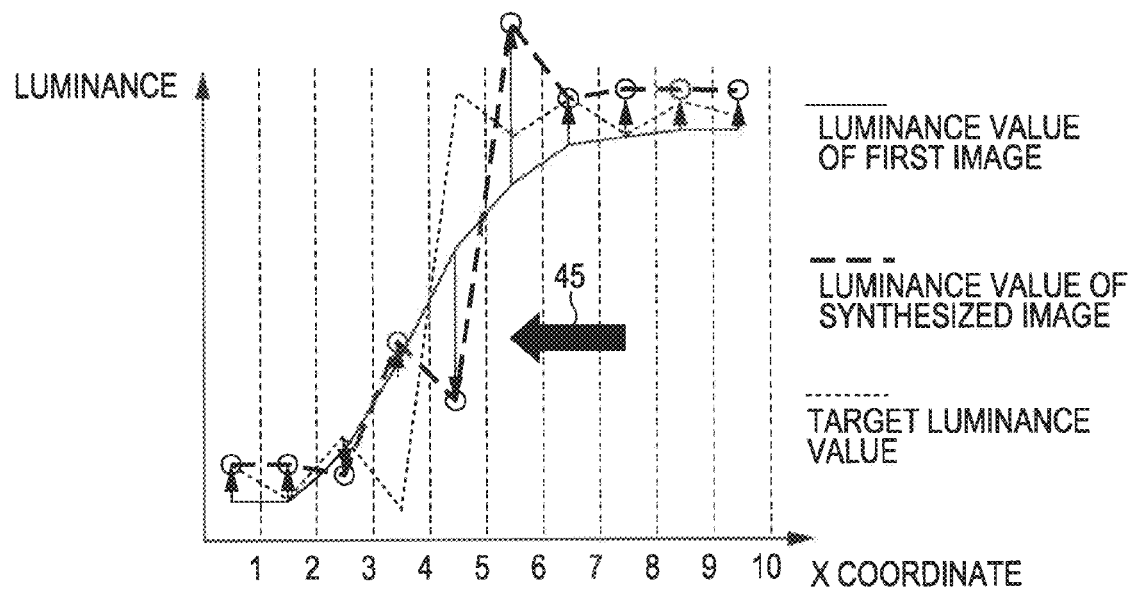
FIG. 15A and FIG. 15B are views that illustrate an example of luminance graphs when the second image is matched with the first image in the embodiment of the invention.
Figure 15B:
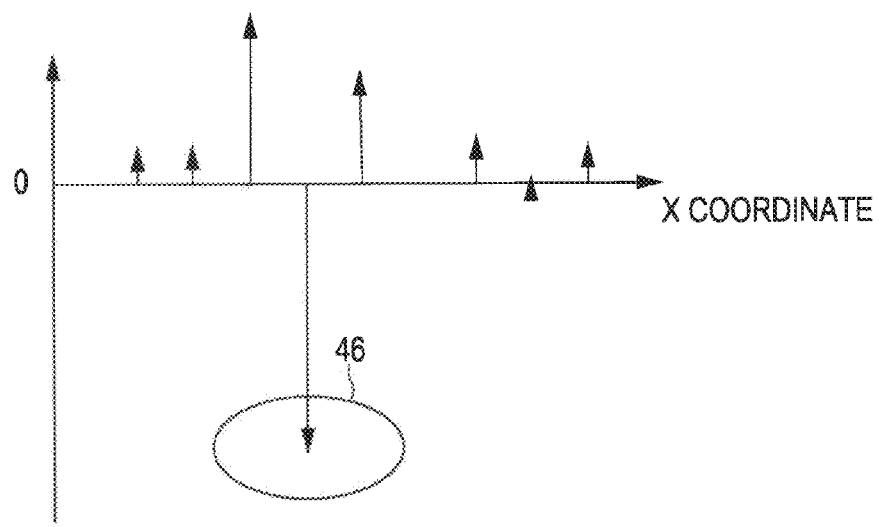

FIG. 15A and FIG. 15B show an example of a luminance graph obtained by shifting the compensation vector 45 shown in FIG. 14 by one pixel. Here, FIG. 15A and FIG. 15B show that, when the second image 6a is pasted onto the first image 5 so as to deviate in one pixel with respect to a pixel that is located at an intended coordinate, how much the luminance values of the synthesized image deviates from the target luminance values. FIG. 15A shows an example of the luminance graph of the synthesized image. FIG. 15B shows an example of differences of the synthesized image with respect to the target luminances. In FIG. 15A, the luminance graph of the first image 5 is indicated by the solid line, the luminance graph of the synthesized image is indicated by the wide broken line, and the luminance graph of the target luminance values is indicated by the narrow broken line. When a subject is captured by a plurality of cameras, a parallax differs among the cameras. Thus, when only an image is pasted, the second image 6a deviates from the first image 5.

Here, as shown in FIG. 15A, the compensation vector 45 is specified with an error of one pixel. In this case, difference values 46 of the luminance values of the synthesized image with respect to the target luminance values are large around the boundary between the objects A and B. However, the difference values 46 are smaller than difference values according to the existing reference method. Therefore, it is possible to suppress deformation of an obtained image.

Figure 16:
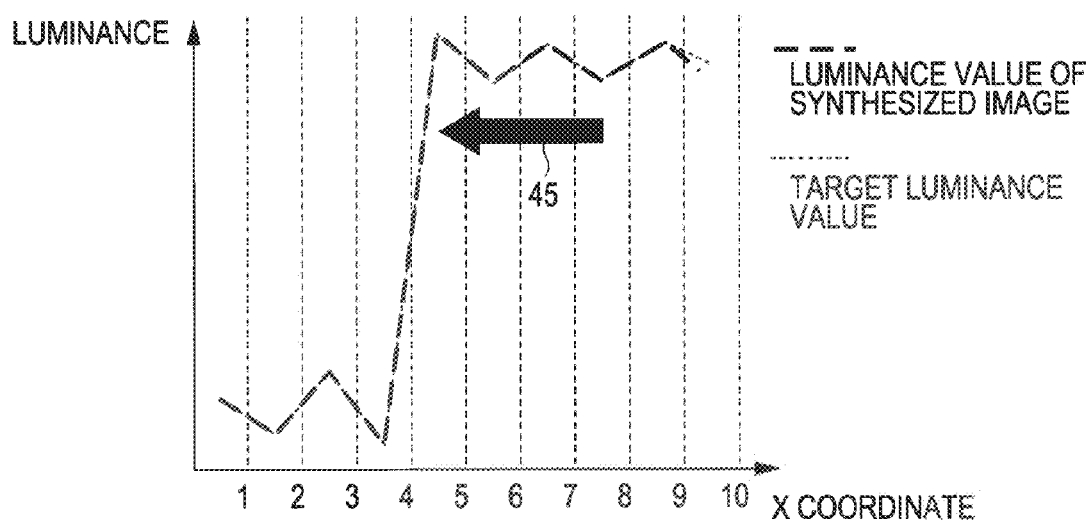
FIG. 16 is a view that illustrates an example of a luminance graph when the second image is matched with the first image in an existing reference method.

FIG. 16 shows an example of a luminance graph when the second image 6a is matched with the first image 5 in accordance with the existing reference method. In FIG. 16, the luminance graph of the synthesized image obtained by matching the second image 6a with the first image 5 is indicated by the wide broken line, and the luminance graph of the target luminance values is indicated by the narrow broken line.

At this time, it is found that the luminance graph of the synthesized image substantially coincides with the luminance graph of the target luminance values. Here, when the second image 6a is matched with the first image 5, it is considered to increase the accuracy of matching using the compensation vector 45. A method of matching images on the basis of the compensation vector is used in MPEG, and the like. In this method, it is not considered whether the luminance values are high or low with respect to the target luminance values; it is important to determine whether the luminance values approach the target luminance values before matching.

Figure 17A:
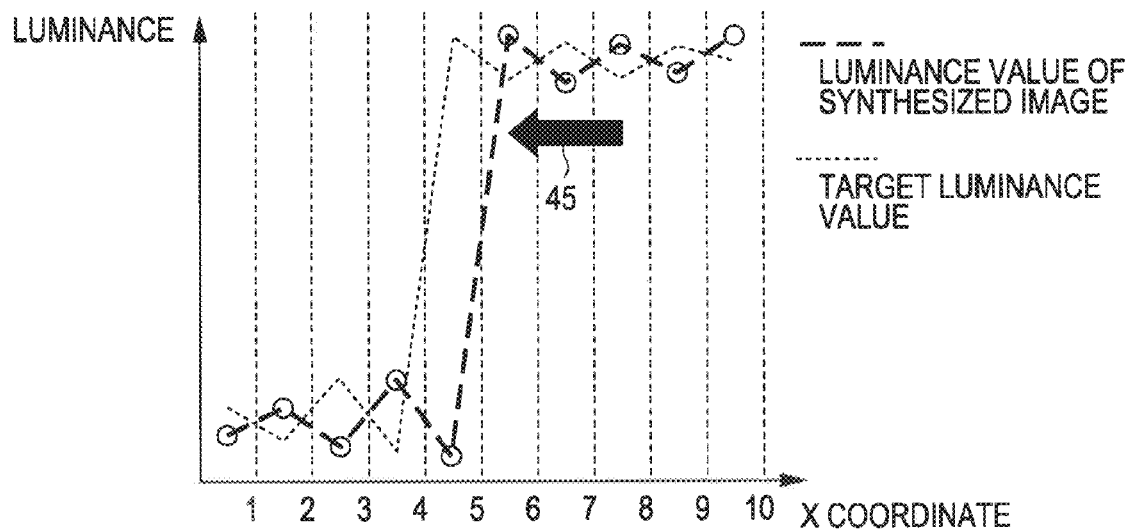
FIG. 17A and FIG. 17B are views that illustrate an example of an image (one-pixel compensation vector error) for which the second image is matched in the existing reference method in the embodiment of the invention.
Figure 17B:
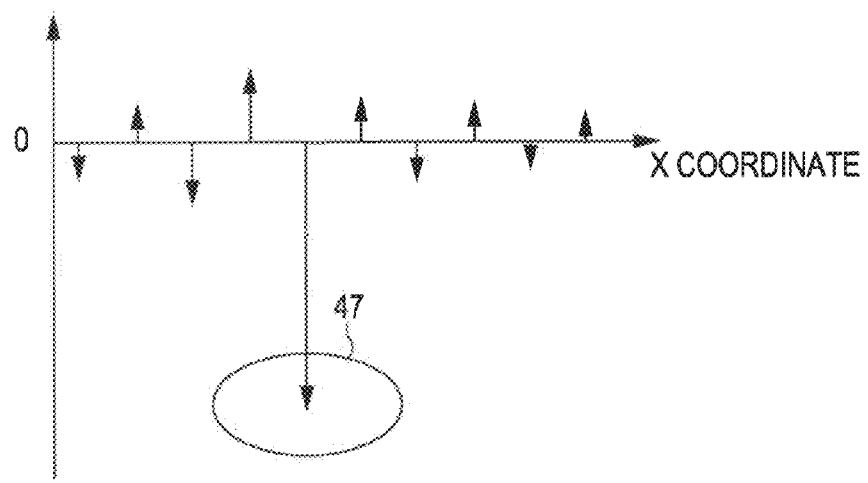

FIG. 17A and FIG. 17B show an example of a luminance graph when the compensation vector 45 shown in FIG. 16 deviates by one pixel. FIG. 17A shows an example of the luminance graph of the synthesized image. FIG. 17B is an example of differences of the synthesized image with respect to the target luminances. In FIG. 17A, the luminance graph of the synthesized image is indicated by the wide broken line, and the luminance graph of the target luminance values is indicated by the narrow broken line.

As in the case of FIG. 15A and FIG. 15B, when the compensation vector deviates by one pixel, the difference value 47 of the luminance value of the synthesized image with respect to the target luminance value at a portion at which the contrast ratio is high is large. In this case, the synthesized image obtained in accordance with the existing reference method may have a deformation in image as compared with the synthesized image obtained in accordance with the image processing according to the embodiment of the invention. The deformation of the image is, for example, shown in FIG. 25, which will be described later.

The synthesized image generated by the image processing apparatus 10 according to the present embodiment is generated so that the high-frequency second images 6a to 6c are pasted onto the low-frequency first image 5. Thus, even when matching is performed with the compensation vector deviated by one pixel, it is possible to suppress a deformation of an image as compared with the case that employs the existing reference method. The image processing apparatus 10 according to the present embodiment matches a low-frequency component image and high-frequency component images to generate a synthesized image by adding both luminance values. Thus, even when the compensation vector is deviated, there is a less deformation of image with respect to the target luminance values.

In addition, when there are individual differences among the second cameras 6a to 6c, the method according to the embodiment of the invention shown in FIG. 14 to FIG. 15B may obtain the highest advantageous effect. For example, when two high-resolution images (second images 6a and 6b) are matched with the luminance values of the first image 5, it is possible to ignore the individual differences among the cameras by removing the low-frequency components of the high-resolution images in which the individual difference of each camera occurs. When the high-resolution images are directly matched as in the case of the existing art, the individual differences among the images are not removed. Therefore, a process of removing the individual differences may be necessary. The image processing apparatus 10 according to the present embodiment does not perform a process of removing the individual differences, so it is possible to simplify the configuration.

Here, examples of images processed in the blocks will be described with reference to FIG. 18 to FIG. 25.

Figure 18:
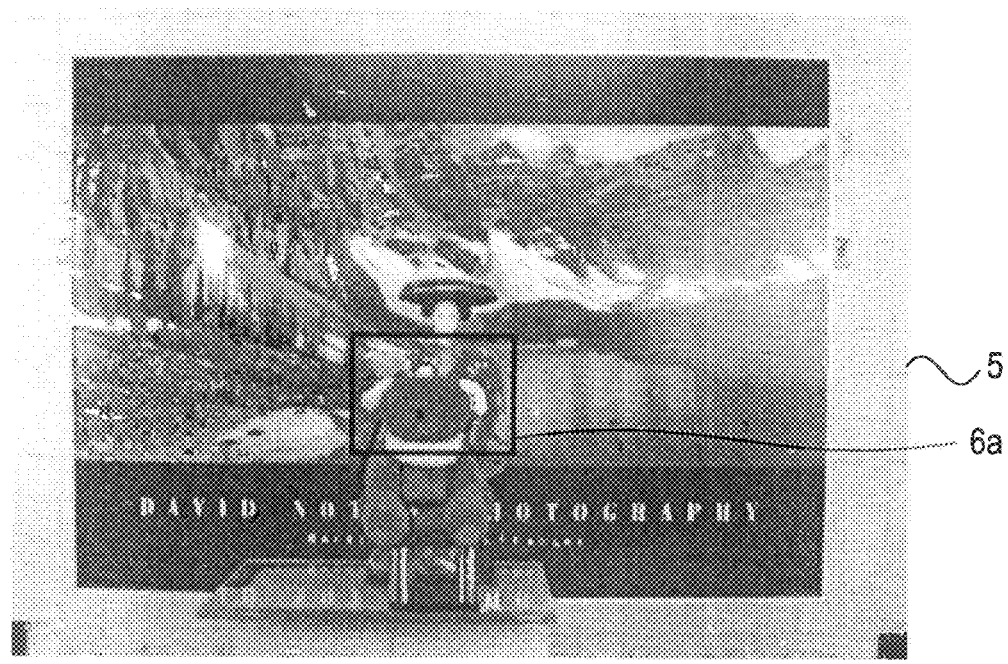
FIG. 18 is a view that illustrates an example of the first image in the embodiment of the invention.

FIG. 18 is an example of the first image 5. The first image 5 is obtained by capturing a subject by the first camera 2. The first image 5 according to the present embodiment captures a subject in which a doll in kimono and a stuffed toy bear are arranged with the background of a landscape photograph. Note that the first image 5 includes a black frame that indicates the position of the second image 6a (see FIG. 19, which will be described later). However, this black frame is provided for the sake of convenience of description, and the black frame does not appear in the actual first image 5.

Figure 19:
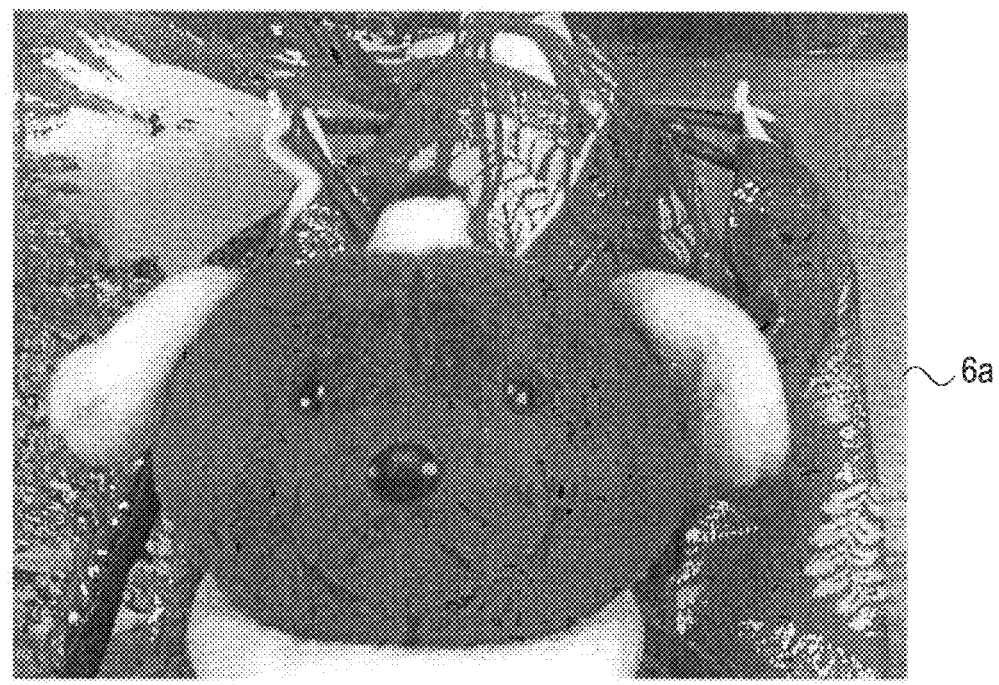
FIG. 19 is a view that illustrates an example of the second image in the embodiment of the invention.

FIG. 19 is an example of the second image 6a. The second image 6a is obtained by capturing a subject (stuffed toy bear) by the second camera 3a. At this time, the second camera 3a captures a subject with a zoomed narrow angle of view as compared with the first camera 2. Thus, the second image 6a is higher in resolution than the first image 5.

Figure 20:
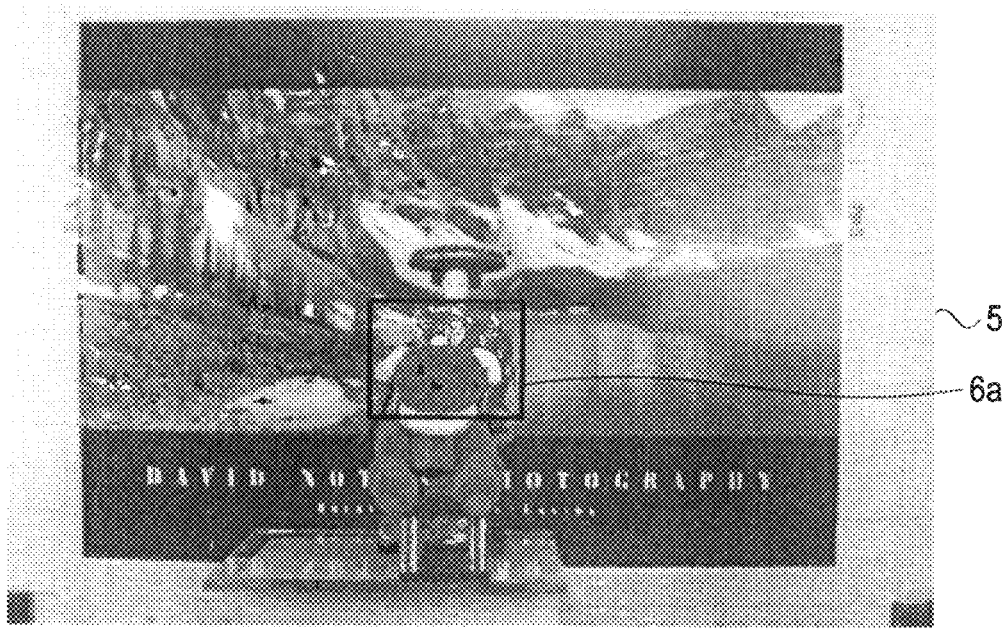
FIG. 20 is a view that shows an example when the second image is superimposed on the first image in the embodiment of the invention.

FIG. 20 is an example in which the second image 6a is superimposed on the first image 5. The image at this time corresponds to an image when matched by the imaging information calculation unit 11. In FIG. 20 as well, the black frame that indicates the second image 6a is provided for the sake of convenience of description, and the black frame does not appear on the first image 5. In this case, it is found that the area in which the stuffed toy bear is included is higher in resolution than the surrounding areas. However, the second image 6a deviates in phase (see FIG. 21, which will be described later) with respect to the first image 5, so the outline is unclear.

Figure 21:
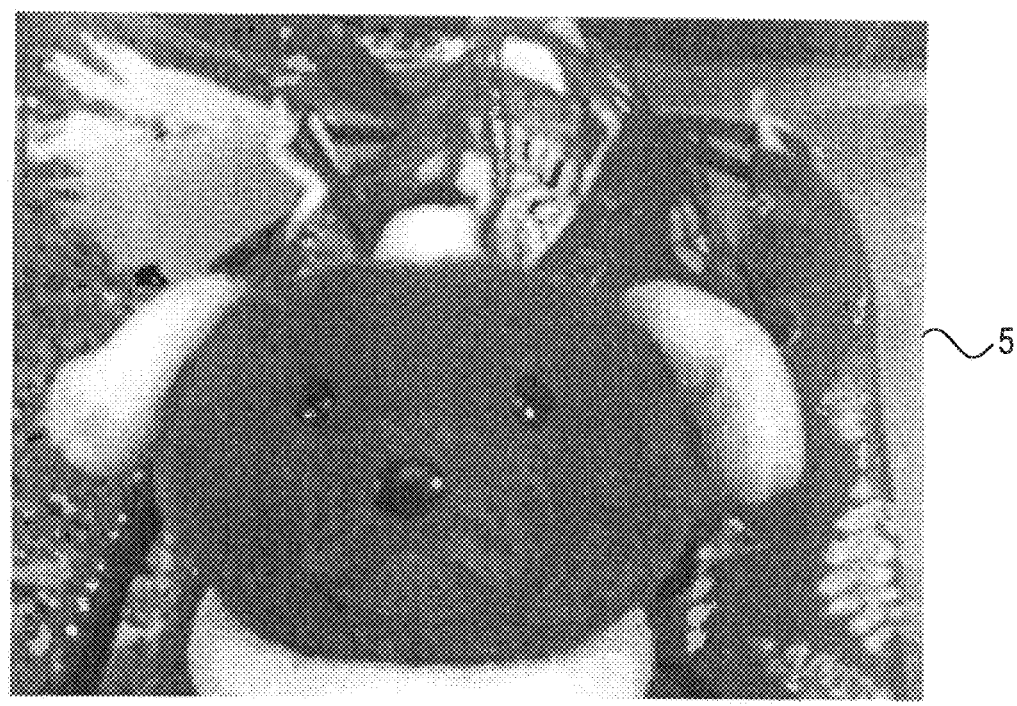
FIG. 21 is a view that illustrates an example of a zoomed first image in the embodiment of the invention.

FIG. 21 is an example in which the first image 5 on which the second image 6a shown in FIG. 20 is superimposed is zoomed. At this time, it is found that the first image 5 and the second image 6a slightly deviate in phase and the image is unclear.

Figure 22:
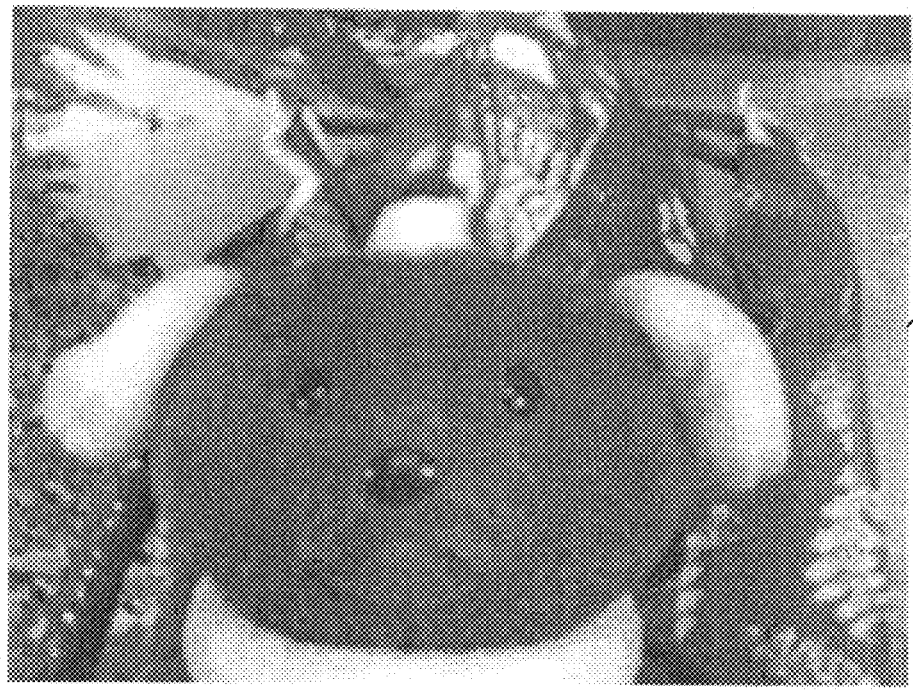
FIG. 22 is a view that illustrates an example of a low-frequency component of the second image in the embodiment of the invention.

FIG. 22 is an example of the second image 6a formed of a low-frequency component. In this embodiment, when the low-frequency component of the second image 6a is extracted by the band separation unit 15, the low-frequency image 8a is generated. The low-frequency image 8a becomes an image in a state where the outline is blurred.

Figure 23:
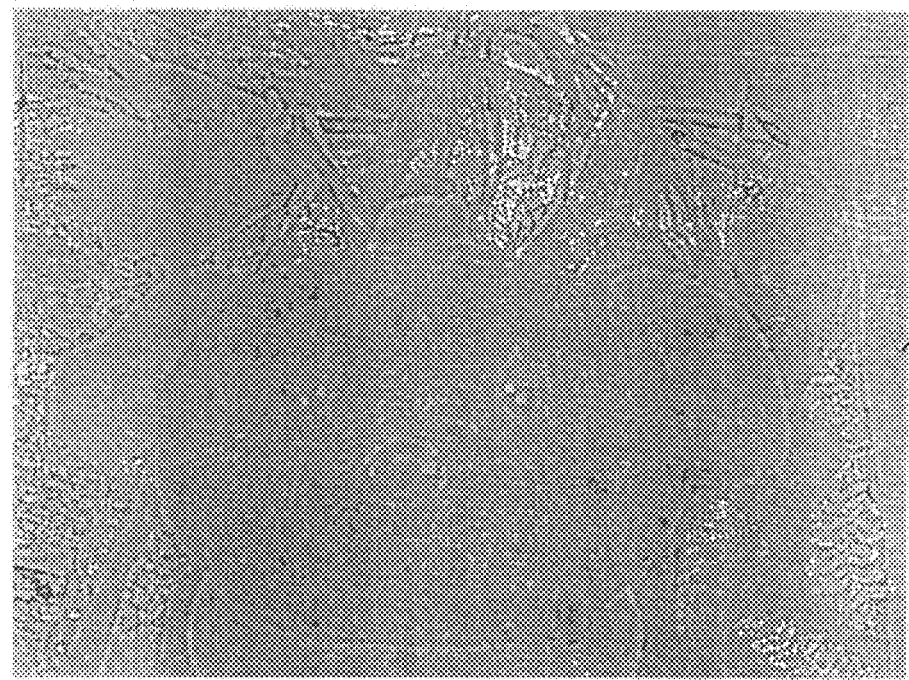
FIG. 23 is a view that illustrates an example of a high-frequency component of the second image in the embodiment of the invention.

FIG. 23 is an example of the second image 6a (high-frequency image 9a) formed of a high-frequency component. In this embodiment, when the high-frequency component of the second image 6a is extracted by the subtracting unit 18, the high-frequency image 9a is generated. The high-frequency image 9a is an image to an extent such that the outline is recognized.

Figure 24:
FIG. 24 is a view that illustrates an example of an image that is obtained by mapping the high-frequency component of the second image onto the first image in the embodiment of the invention.

FIG. 24 is an example in which the high-frequency component second image 9a is mapped onto the first image 8a. This image is output from the image processing apparatus 10 to the display device 20. The image is obtained by mapping the second image 6a (see FIG. 23) formed of a high-frequency component onto the first image 5.

Figure 25:
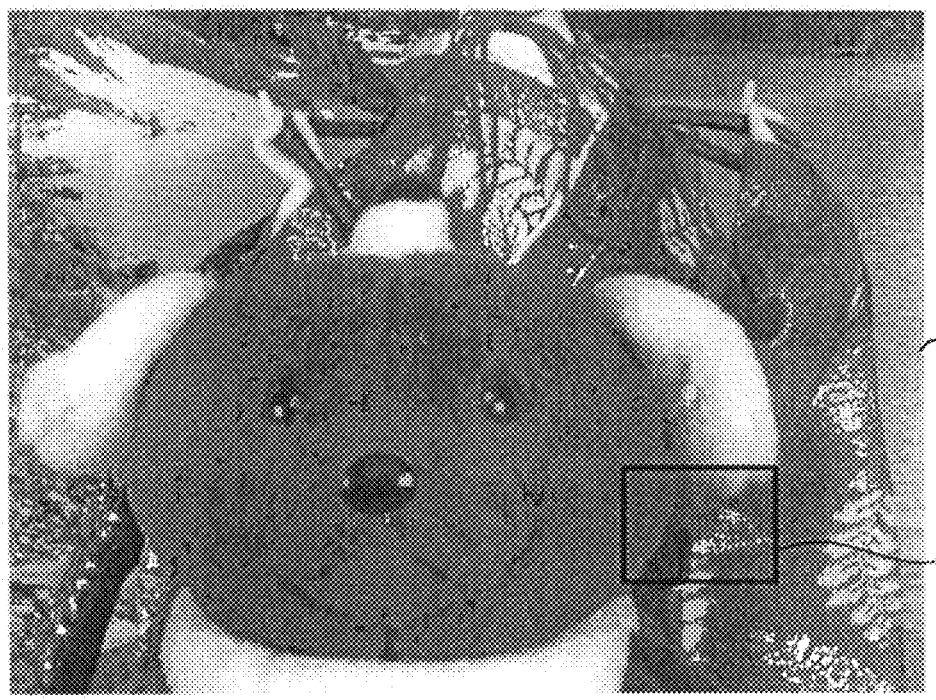
FIG. 25 is a view that illustrates an example of an image in which the second image is mapped in the embodiment of the invention.

FIG. 25 is an example in which only the high-frequency component second image 9a is mapped. In this case, a parallax occurs in a partial image 25 of the subject, and the boundary between the subject and the background is unclear. For example, it is assumed that the luminance value of the low-frequency component of the first image 5 is 100, the luminance value of the second image 6a is 140, and the luminance value of the high-frequency component of the second image 6a is 130. At this time, when using the existing reference method, the luminance value will be 140. However, in the image synthesizing method performed by the image processing apparatus 10 according to the present embodiment, the luminance value will be 100+140−130=110.

With the image processing apparatus 10 according to the above described present embodiment, when capturing is performed by the plurality of cameras 3a to 3c, it is possible to perform capturing by assigning the attributes (resolution, eyepoint, color, luminance and focus) of the cameras 3a to 3c. Then, when a new image is synthesized from a plurality of images captured by the cameras 3a to 3c of which the attributes (resolution, eyepoint, color, luminance and focus) are different, the detailed parameter information in each image is used among the images.

As a result, the high-resolution synthesized image is obtained from the first image 5 and the second images 6a to 6c. At this time, to paste only the high-frequency components of the second images 6a to 6c onto the low-frequency component of the first image 5, the images are synthesized naturally using the chromaticness of the first image 5. Then, the synthesized image generated in the present embodiment may be any one of a static image and a dynamic image.

In addition, even when the eyepoints of the plurality cameras do not coincide with one another, individual information with respect to common information may be acquired for each of the second cameras 3a to 3c. Then, to adjust the parameter on the basis of the individual information, a synthesized image in which the images are smoothly pieced is obtained. Thus, there are no limitations on the number of second cameras 3a to 3c or restrictions on the arrangement.

In addition, when only the first camera 2 is used to capture a subject having a large difference in luminance, the obtained first image 5 does not accurately capture portions of a low luminance or a high luminance. However, these portions may be complemented by the second images 6a to 6c captured by the second cameras 3a to 3c. Thus, the obtained synthesized image is a multiple-grayscale (high dynamic range) image.

Note that, in the image processing apparatus according to the above described embodiment, multiple number of the structures may be stacked, and it is possible to perform capturing in high resolution as long as the mechanism of the camera is allowed. Here, another embodiment will be described with reference to FIG. 26.

Figure 26:
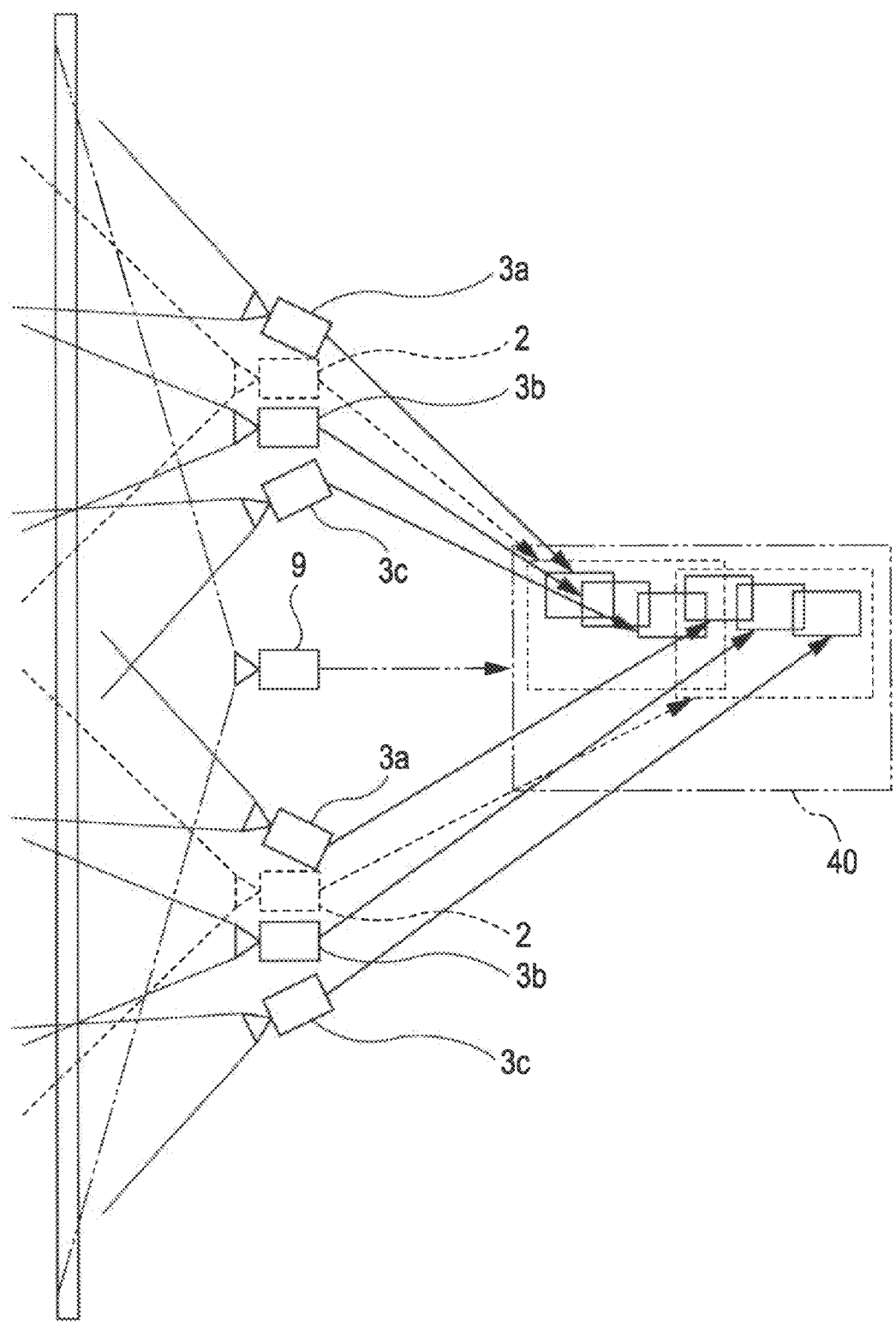
FIG. 26 is a view that illustrates an example of output of a synthesized image in another embodiment of the invention.
Figure 27:
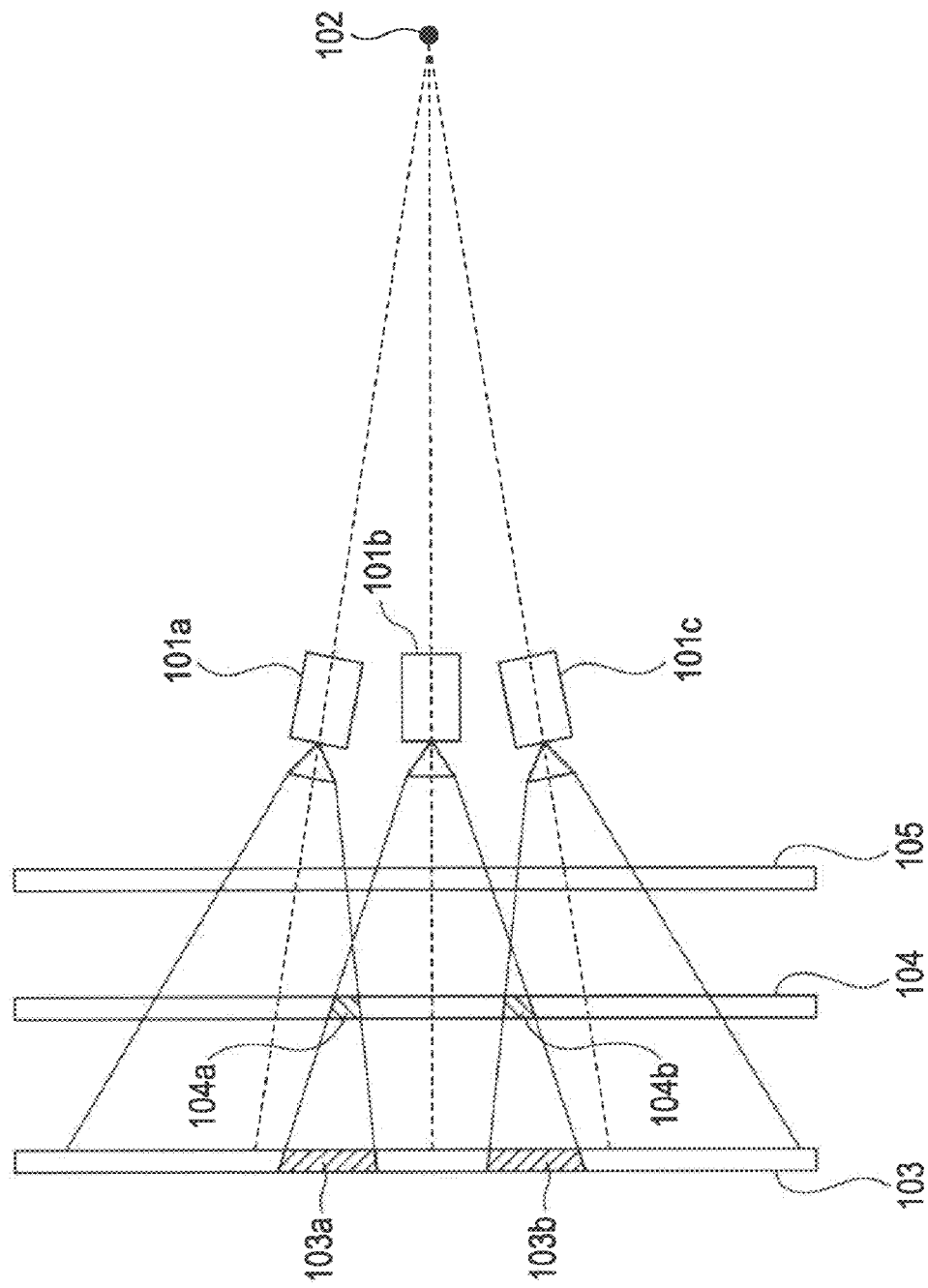
FIG. 27 is a view that illustrates an example of arrangement of cameras in an existing single eyepoint method.
Figure 28:
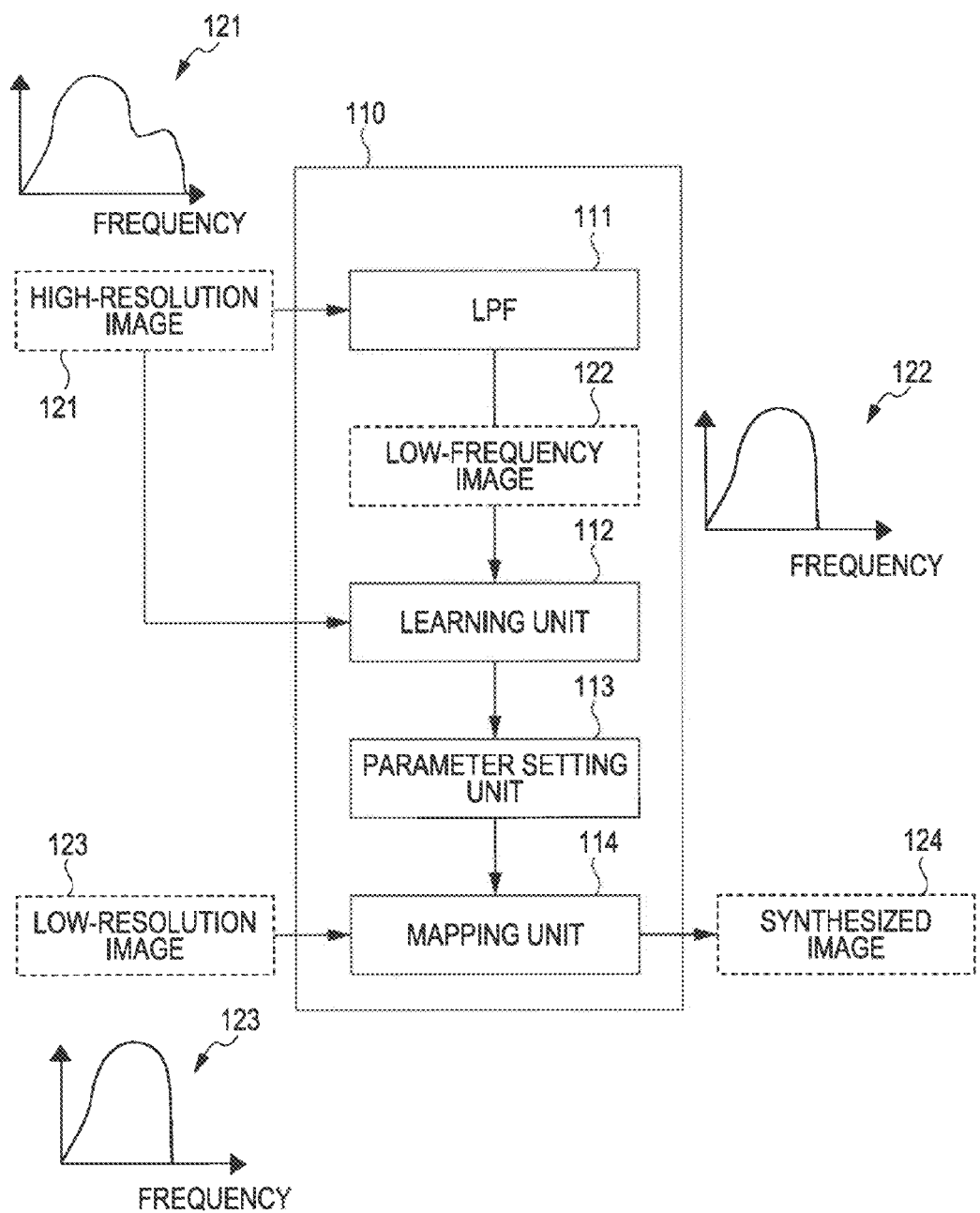
FIG. 28 is a block diagram that shows an example of the configuration of an existing image processing apparatus.
Figure 29:
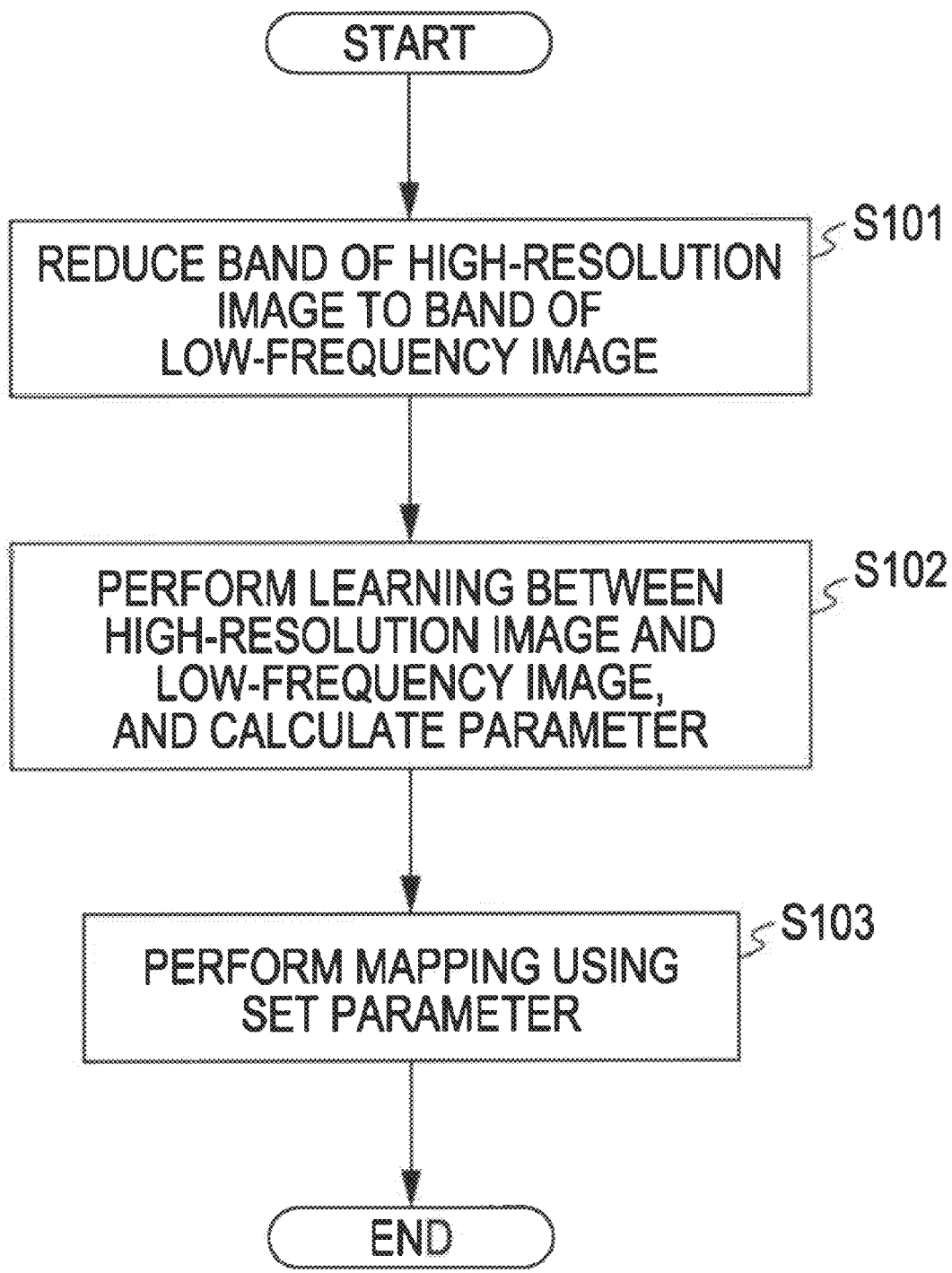
FIG. 29 is a flowchart that shows an example of existing image processing.

FIG. 26 is an example of arrangement of a plurality of camera units. When a set of the first camera 2 and the second cameras 3a to 3c shown in FIG. 4 is one unit, a plurality of units are arranged. In this embodiment, a third camera 9 that captures a subject at an angle of view wider than that of the first camera 2 is further provided. However, the basic operation is similar to the case in which the one unit formed of the first camera 2 and the second cameras 3a to 3c is used. At this time, with respect to an image 40 captured by the third camera 9 as a reference, each unit performs capturing in a state where a deviation with respect to the image 40 is corrected and synthesized images are arranged. Then, a high-resolution synthesized image with a multi-stage configuration may be obtained. Thus, it is advantageous in that a stereo image that has a high resolution and no deformation may be obtained.

In addition, a series of processes in the above described embodiments may be executed by hardware or may be executed by software. When the series of processes are executed by software, programs that constitute the software are installed onto a computer that is assembled to exclusive hardware or programs that constitute desired software are installed on, for example, a general-purpose computer that is able to execute various functions by installing various programs.

In addition, a recording medium that records a program code of software that implements the functions of the above described embodiments is supplied to a system or an apparatus, and, of course, the functions of the above described embodiments may be implemented by a computer (or a controller, such as a CPU) of the system or apparatus reads and executes a program code stored in the recording medium.

The recording medium for supplying the program code in this case may, for example, include a floppy disk, a hard disk, an optical disk, a magneto-optical disk, a CD-ROM, a CD-R, a magnetic tape, a nonvolatile memory card, a ROM, and the like.

In addition, the embodiment of the invention not only includes the case where the functions of the above described embodiments are implemented by executing the program code read by the computer but also an OS, or the like, operating on the computer executes part of or the entire actual processes on the basis of an instruction of the program code, and then the functions of the above described embodiments are implemented by those processes.

Note that in the specification, steps that describes programs constituting software include not only processes executed in the written order in time sequence but also processes that are executed in parallel or separately even when the processes are not executed in time sequence.

Furthermore, the embodiment of the invention is not limited to the above described embodiments; of course, it may be modified into various forms without departing from the scope of the invention.

The present application contains subject matter related to that disclosed in Japanese Priority Patent Application JP 2008-169446 filed in the Japan Patent Office on Jun. 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an imaging information calculation unit that acquires a first image generated by a first camera that captures a predetermined range at a first angle of view, that acquires a plurality of second images generated by a plurality of second cameras, each of which captures a portion of the predetermined range at a second angle of view that is narrower than the first angle of view, the second images being higher in resolution than the first image, and that calculates coordinate positions of the plurality of second images with respect to the first image and differences of imaging directions of the plurality of second cameras with respect to an imaging direction of the first camera as capturing information;
an eyepoint conversion unit that generates eyepoint conversion images that are obtained by converting the plurality of second images on the basis of the differences of the imaging directions calculated by the imaging information calculation unit so that eyepoints of the plurality of second cameras are made to coincide with an eyepoint of the first camera and matches the first image with the eyepoint conversion images to calculate deviations in phase of the eyepoint conversion images with respect to the first image; and
an image synthesizing unit that extracts high-frequency images, formed of frequency components higher than or equal to a predetermined frequency band, from the plurality of second images, and that pastes the high-frequency images at the coordinate positions in correspondence with the first image so as to eliminate the deviations in phase of the eyepoint conversion images with respect to the first image, calculated by the eyepoint conversion unit, to generate a synthesized image.

2. The image processing apparatus according to claim 1, further comprising:
a zoom conversion unit that generates zoomed images by zooming portions of the first image corresponding to the coordinate positions of the second images on the basis of the coordinate positions calculated by the imaging information calculation unit and zoom rates by which the portions of the first image are zoomed, wherein
the eyepoint conversion unit matches the zoomed images with the eyepoint conversion images to calculate the deviations in phase of the eyepoint conversion images with respect to the first image.

3. The image processing apparatus according to claims claim 2, wherein
the eyepoint conversion unit includes:
a band separation unit that separates a plurality of low-frequency images, of which the frequencies are lower than the predetermined frequency band, from the plurality of second images;
a matching unit that matches the zoomed images zoomed by the zoom conversion unit with the plurality of low-frequency images separated by the band separation unit; and
a compensation vector calculation unit that calculates deviations in phase between the zoomed images and the plurality of low-frequency images, which are matched by the matching unit, as compensation vectors and that supplies the compensation vectors to the image synthesizing unit, and wherein
the image synthesizing unit includes:
a subtracting unit that subtracts frequency components of the plurality of low-frequency images separated by the band separation unit from frequency components of the second images to generate the high-frequency images; and
a mapping unit that corrects the deviations in phase on the basis of the compensation vectors supplied from the compensation vector calculation unit to map the high-frequency images at the coordinate positions in correspondence with the zoomed images.

4. The image processing apparatus according to claim 3, wherein
the matching unit obtains at least any one of pieces of information about color, luminance and focus as a parameter by which an amount of characteristic of each of the plurality of low-frequency images with respect to the corresponding zoomed images is determined pixel by pixel.

5. The image processing apparatus according to claim 4, wherein
the imaging information calculation unit manages the parameter as common information using the first camera as a reference, and manages information of the plurality of second cameras with respect to the common information as individual information.

6. The image processing apparatus according to claim 5, wherein
the plurality of low-frequency images are images of which bands are matched with those of the zoomed images.

7. The image processing apparatus according to claim 5, wherein
a zoom rate of the first image, converted by the zoom conversion unit, is variable, and wherein
values of the predetermined frequency at which the band separation unit separates are values that are obtained by multiplying inverse numbers of the zoom rates calculated by the imaging information calculation unit.

8. The image processing apparatus according to claim 6, wherein
each of the second cameras changes a resolution and a luminance for each imaging area on the basis of the zoom rate, changes a focus for each imaging area on the basis of a distance to a subject, changes a white balance for each imaging area in accordance with color of a captured image and changes an eyepoint to the subject.

9. An image processing method comprising the steps of:
acquiring a first image generated by a first camera that captures a predetermined range at a first angle of view, acquiring a plurality of second images generated by a plurality of second cameras, each of which captures a portion of the predetermined range at a second angle of view that is narrower than the first angle of view, the second images being higher in resolution than the first image, and then calculating coordinate positions of the plurality of second images with respect to the first image and differences of imaging directions of the plurality of second cameras with respect to an imaging direction of the first camera as capturing information;
generating eyepoint conversion images that are obtained by converting the plurality of second images on the basis of the differences of the imaging directions so that eyepoints of the plurality of second cameras are made to coincide with an eyepoint of the first camera and then matching the first image with the eyepoint conversion images to calculate deviations in phase of the eyepoint conversion images with respect to the first image; and
extracting high-frequency images, formed of frequency components higher than or equal to a predetermined frequency band, from the plurality of second images and then pasting the high-frequency images at the coordinate positions in correspondence with the first image so as to eliminate the deviations in phase of the eyepoint conversion images with respect to the first image to generate a synthesized image.

10. A non-transitory computer-readable storage medium storing instruction thereon which, when executed by a computer, cause the computer to execute a process comprising the steps of:
acquiring a first image generated by a first camera that captures a predetermined range at a first angle of view, acquiring a plurality of second images generated by a plurality of second cameras, each of which captures a portion of the predetermined range at a second angle of view that is narrower than the first angle of view, the second images being higher in resolution than the first image, and then calculating coordinate positions of the plurality of second images with respect to the first image and differences of imaging directions of the plurality of second cameras with respect to an imaging direction of the first camera as capturing information;
generating eyepoint conversion images that are obtained by converting the plurality of second images on the basis of the differences of the imaging directions so that eyepoints of the plurality of second cameras are made to coincide with an eyepoint of the first camera and then matching the first image with the eyepoint conversion images to calculate deviations in phase of the eyepoint conversion images with respect to the first image; and
extracting high-frequency images, formed of frequency components higher than or equal to a predetermined frequency band, from the plurality of second images and then pasting the high-frequency images at the coordinate positions in correspondence with the first image so as to eliminate the deviations in phase of the eyepoint conversion images with respect to the first image to generate a synthesized image.

* * * * *